Oct. 5, 1965　　　　　　C. LUDWIG　　　　　　3,209,927
SYSTEM FOR MOVING AND EMPTYING RAILROAD CARS
Filed June 15, 1962　　　　　　　　　　　　　21 Sheets-Sheet 1

INVENTOR.
CARL LUDWIG
BY
Justin W. Macklin
ATTORNEY

Oct. 5, 1965   C. LUDWIG   3,209,927
SYSTEM FOR MOVING AND EMPTYING RAILROAD CARS
Filed June 15, 1962   21 Sheets-Sheet 2
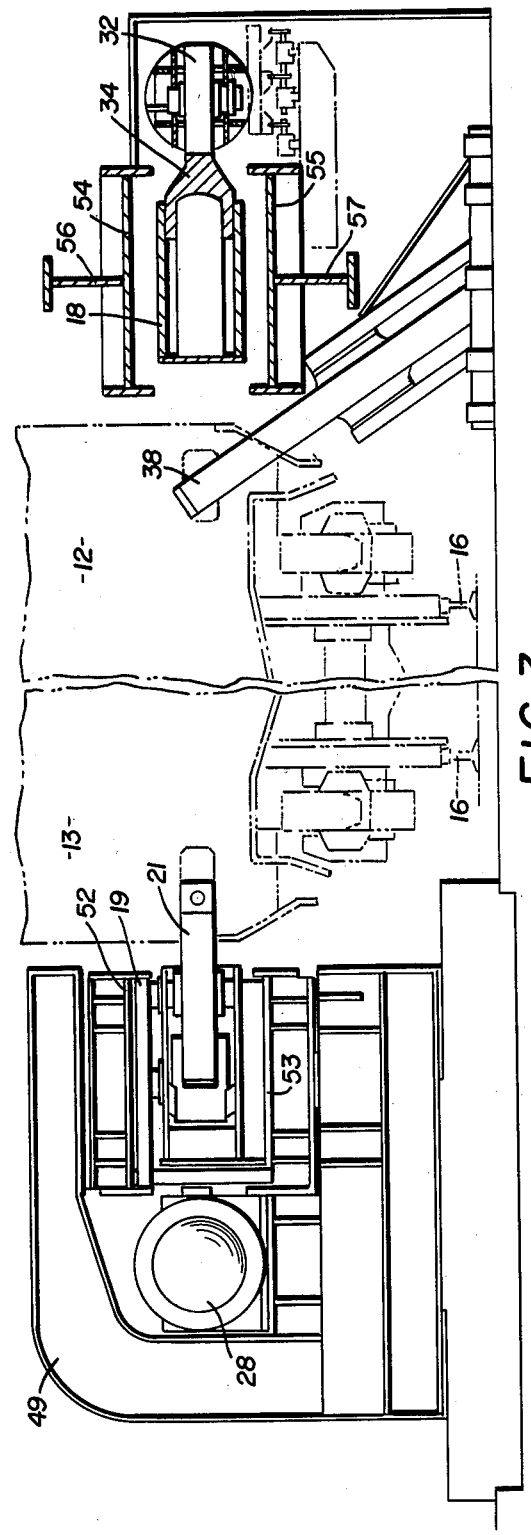
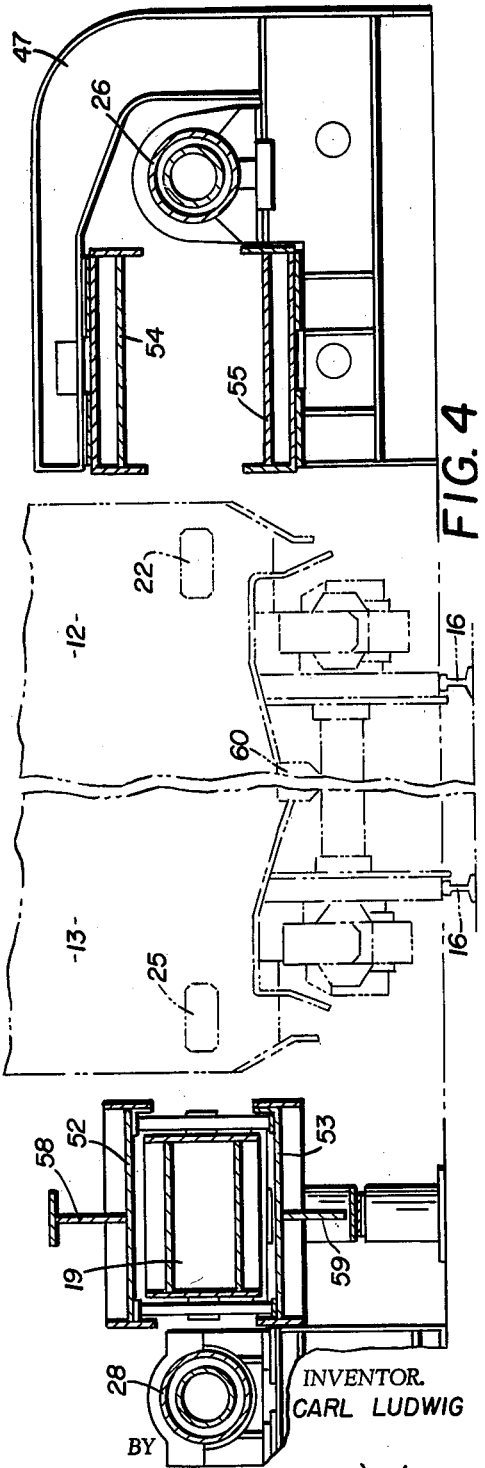
INVENTOR.
CARL LUDWIG
BY
ATTORNEY Oct. 5, 1965  C. LUDWIG  3,209,927
SYSTEM FOR MOVING AND EMPTYING RAILROAD CARS
Filed June 15, 1962  21 Sheets-Sheet 3
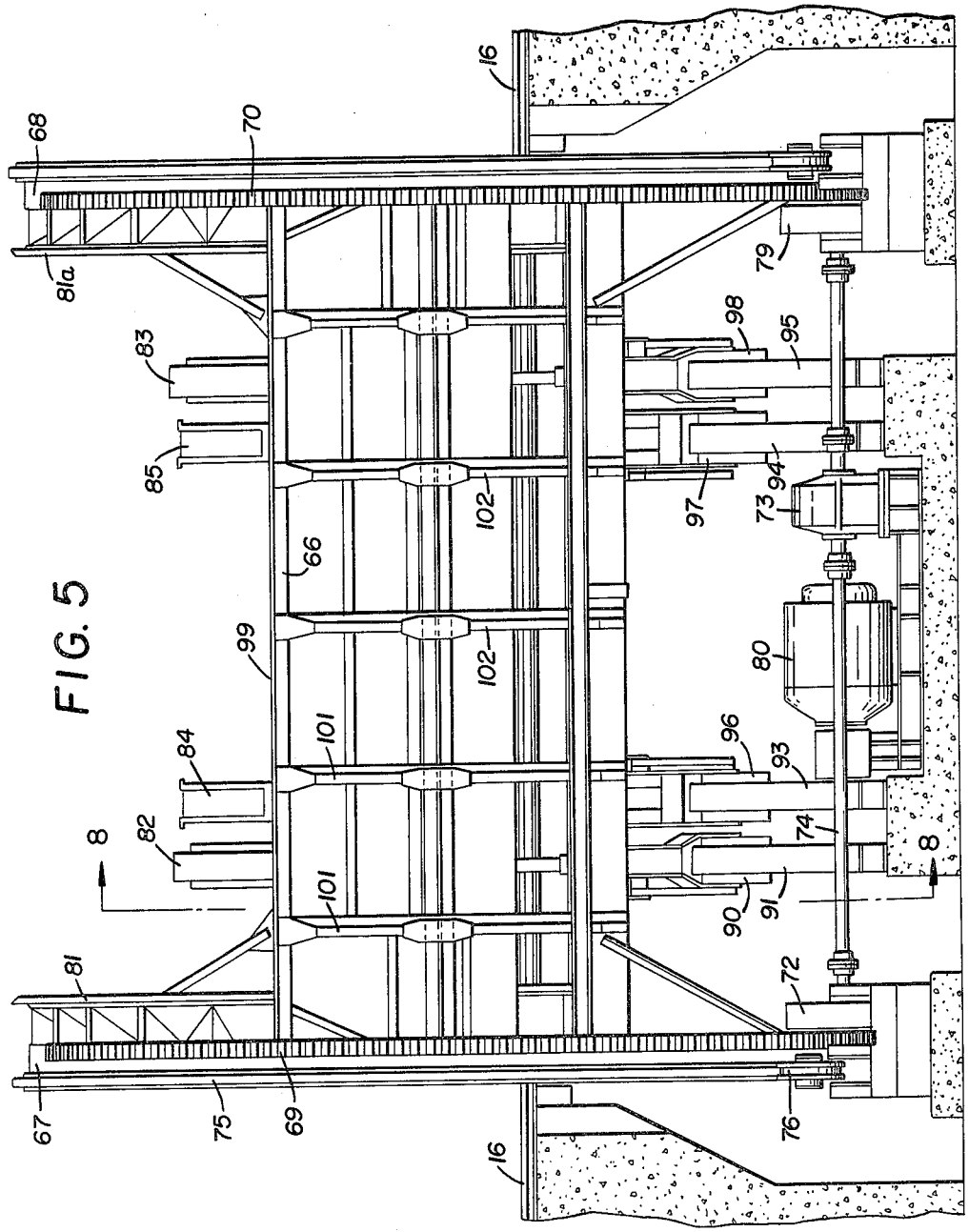
INVENTOR.
CARL LUDWIG
BY
ATTORNEY Oct. 5, 1965  C. LUDWIG  3,209,927
SYSTEM FOR MOVING AND EMPTYING RAILROAD CARS
Filed June 15, 1962  21 Sheets-Sheet 5

INVENTOR.
CARL LUDWIG
BY
*Justin W. Macklin*
ATTORNEY

Oct. 5, 1965 C. LUDWIG 3,209,927
SYSTEM FOR MOVING AND EMPTYING RAILROAD CARS
Filed June 15, 1962 21 Sheets-Sheet 6

INVENTOR.
CARL LUDWIG
BY
ATTORNEY

Oct. 5, 1965 C. LUDWIG 3,209,927
SYSTEM FOR MOVING AND EMPTYING RAILROAD CARS
Filed June 15, 1962 21 Sheets-Sheet 7
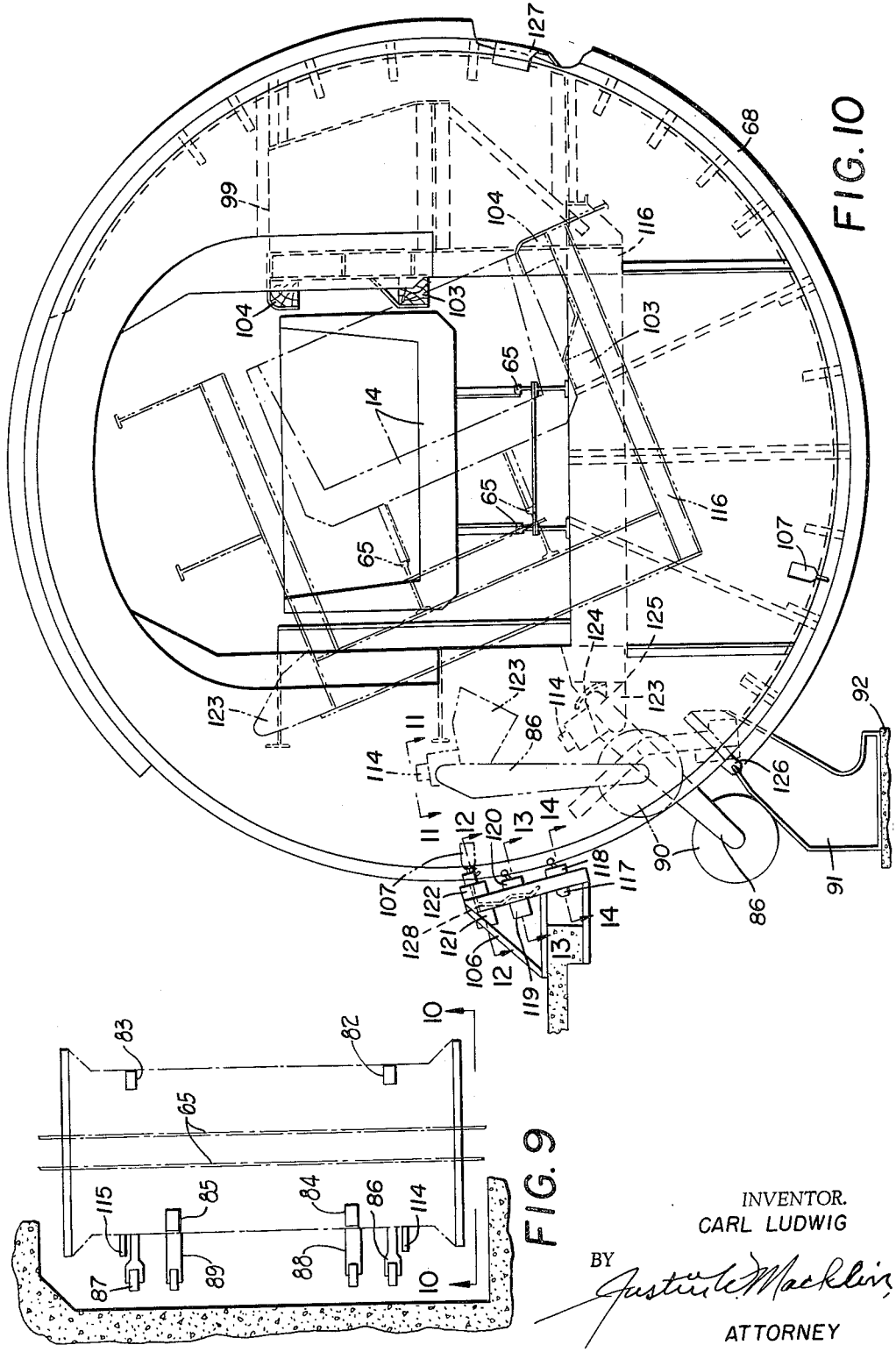
INVENTOR.
CARL LUDWIG
BY
Justin C. Macklin
ATTORNEY Oct. 5, 1965   C. LUDWIG   3,209,927
SYSTEM FOR MOVING AND EMPTYING RAILROAD CARS
Filed June 15, 1962   21 Sheets-Sheet 8

INVENTOR.
CARL LUDWIG

BY
*Justice Macklin*
ATTORNEY

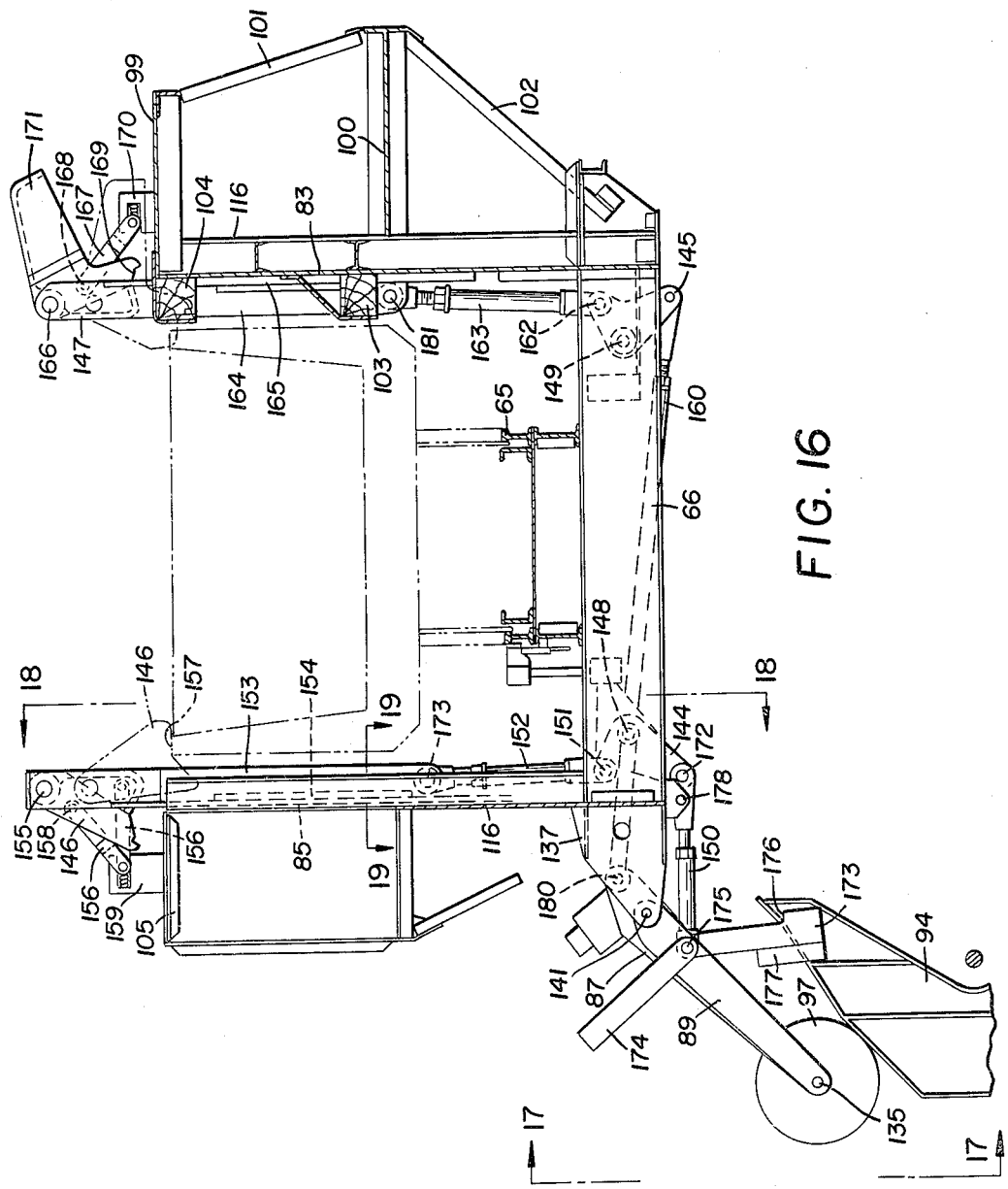

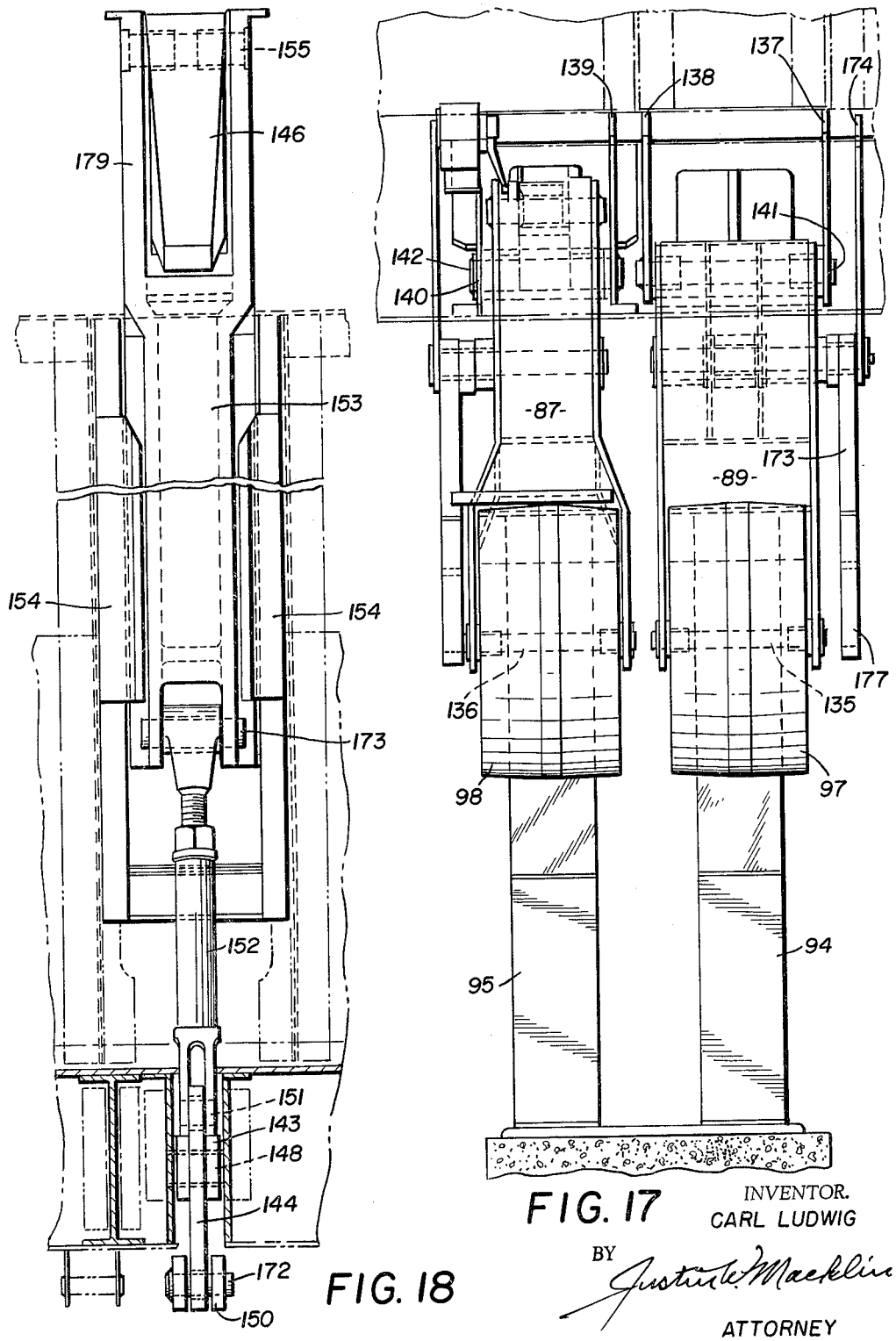

INVENTOR.
CARL LUDWIG
BY
ATTORNEY

Oct. 5, 1965  C. LUDWIG  3,209,927
SYSTEM FOR MOVING AND EMPTYING RAILROAD CARS
Filed June 15, 1962  21 Sheets-Sheet 13

INVENTOR.
CARL LUDWIG
BY
ATTORNEY

Oct. 5, 1965 C. LUDWIG 3,209,927
SYSTEM FOR MOVING AND EMPTYING RAILROAD CARS
Filed June 15, 1962 21 Sheets-Sheet 14

INVENTOR.
CARL LUDWIG
BY
*Justin W. Macklin,*
ATTORNEY

Oct. 5, 1965　　　　　　C. LUDWIG　　　　　　3,209,927
SYSTEM FOR MOVING AND EMPTYING RAILROAD CARS
Filed June 15, 1962　　　　　　　　　　　　21 Sheets-Sheet 15

INVENTOR.
CARL LUDWIG
BY
*Justin C. Macklin*
ATTORNEY

Oct. 5, 1965   C. LUDWIG   3,209,927
SYSTEM FOR MOVING AND EMPTYING RAILROAD CARS
Filed June 15, 1962   21 Sheets-Sheet 16

INVENTOR.
CARL LUDWIG
BY Justin W Macklin,
ATTORNEY

Oct. 5, 1965 C. LUDWIG 3,209,927
SYSTEM FOR MOVING AND EMPTYING RAILROAD CARS
Filed June 15, 1962 21 Sheets-Sheet 17

INVENTOR.
CARL LUDWIG
BY
ATTORNEY

Oct. 5, 1965 C. LUDWIG 3,209,927
SYSTEM FOR MOVING AND EMPTYING RAILROAD CARS
Filed June 15, 1962 21 Sheets-Sheet 18
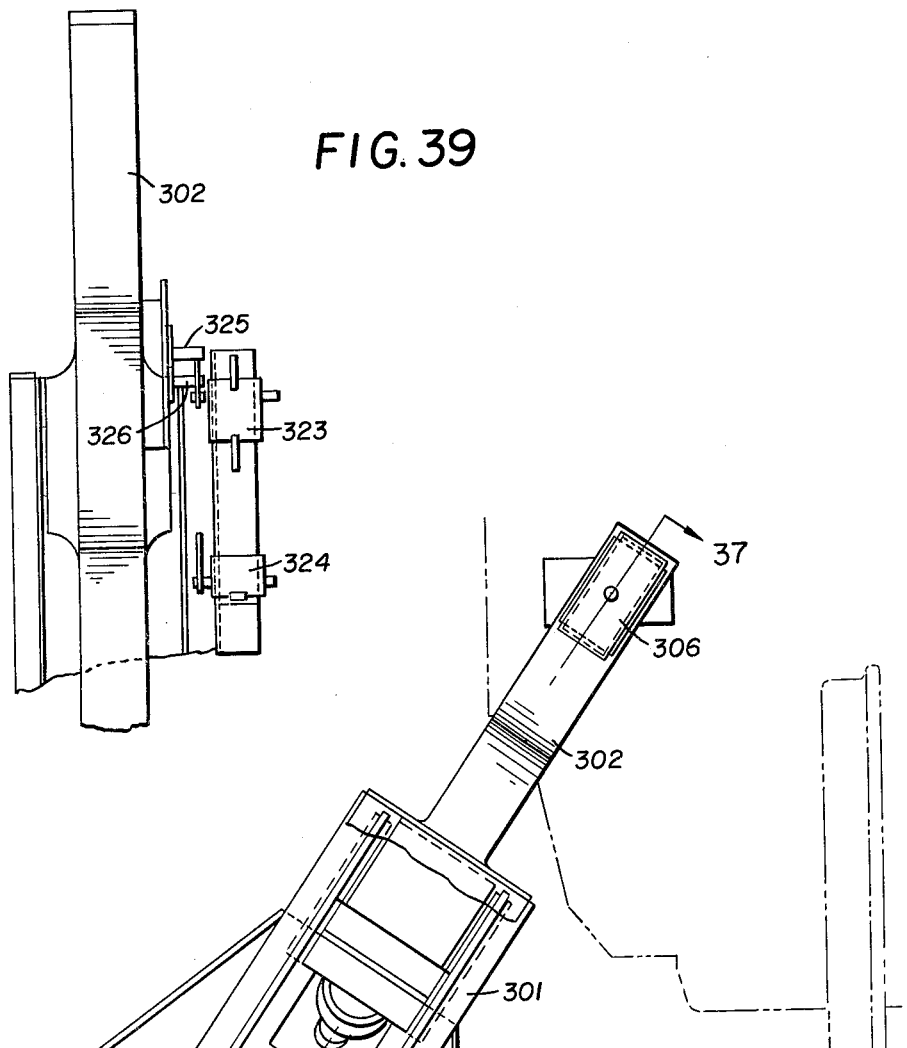
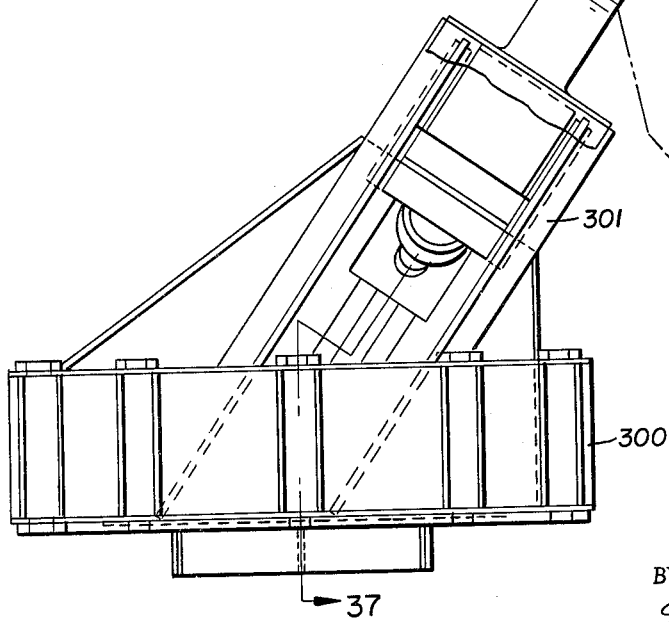
INVENTOR.
CARL LUDWIG
BY
ATTORNEY

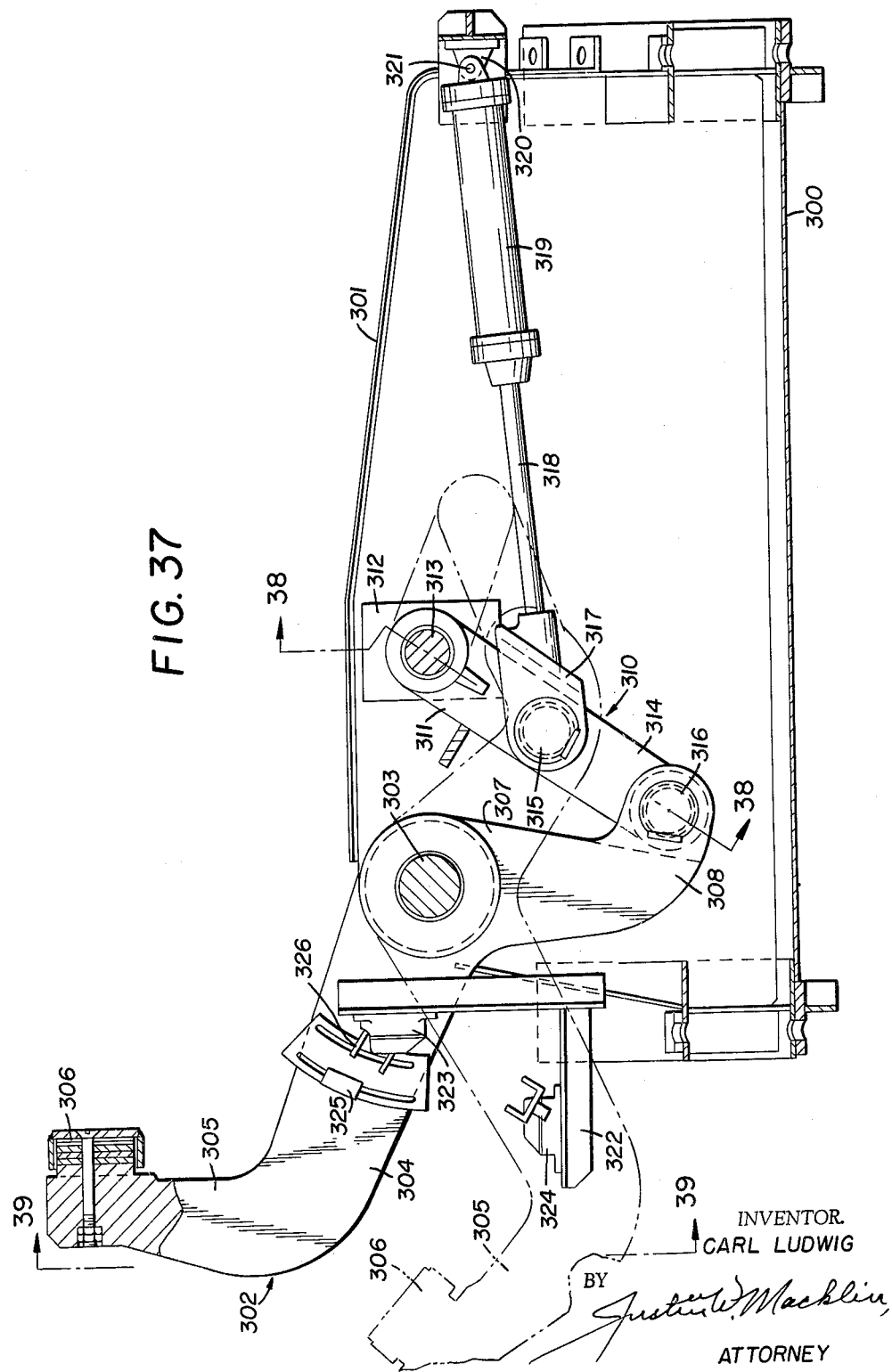

Oct. 5, 1965   C. LUDWIG   3,209,927
SYSTEM FOR MOVING AND EMPTYING RAILROAD CARS
Filed June 15, 1962   21 Sheets-Sheet 20

INVENTOR.
CARL LUDWIG
BY
ATTORNEY

INVENTOR.
CARL LUDWIG

United States Patent Office 3,209,927
Patented Oct. 5, 1965

3,209,927
SYSTEM FOR MOVING AND EMPTYING
RAILROAD CARS
Carl Ludwig, Cleveland, Ohio, assignor, by mesne assignments, to McDowell-Wellman Engineering Company
Filed June 15, 1962, Ser. No. 206,540
12 Claims. (Cl. 214—55)

This invention relates, as indicated, to apparatus for unloading bulk material from railroad cars, and, more particularly, to apparatus for sequentially advancing one or more gondola-type cars in a train into a rotary car dumping device and removing emptied cars without uncoupling the cars.

In transferring bulk materials such as coal, iron ore, limestone, sulphur, grains, etc. from land vehicles, e.g. railroad trains, to ships for trans-shipment by water, time consumed in effecting the transfer is a very costly item at current demurrage rates. The present system and apparatus achieves the desirable objectives of improved efficiency and economy by facilitating the handling and transfer of bulk materials and enabling car unloading time cycles of approximately 1 minute per car and tonnages of the magnitude of 10,000 tons per hour.

To the accomplishment of the foregoing and related ends, then, the present invention consists in the means hereinafter more particularly described in the specification and illustrated in the annexed drawings, the latter being illustrative of but a single preferred embodiment, it being understood that means other than those specifically described and illustrated may be employed without departing from the spirit of the invention. In the annexed drawings:

FIG. 3 is an enlarged cross-sectional view taken on the line 3—3 of FIG. 1.

FIG. 4 is an enlarged cross-sectional view taken on the line 4—4 of FIG. 1.

FIG. 5 is a side elevation of a railroad car dumping cradle useful in accordance with the present invention.

FIG. 9 is a diagrammatic plan view of the dumping device shown in FIGS. 5-8 showing the location of control means for programmed operation of the dumper.

FIG. 10 is an end view of a car dumping apparatus showing the location of control means.

FIG. 16 is a cross-section taken on the line 16—16 of FIG. 7 and shows the details of a preferred form of car clamping device.

FIG. 17 is an enlarged elevation taken on the line 17—17 of FIG. 16.

FIG. 18 is a fragmentary view in enlarged scale of a portion of a typical clamping device taken on the line 18—18 of FIG. 16.

FIG. 36 is a front elevation of a railroad car positioning buffer.

FIG. 37 is a cross-sectional view taken on the offset planes indicated by the line 37—37 of FIG. 36.

FIG. 39 is a fragmentary elevation taken on the line 39—39 of FIG. 37 showing the upper portion of the arm and the location of associated limit switches and actuators.

Briefly stated, then, this invention is in the provision of an improved railroad car unloading apparatus comprising in combination a rotary car dumper and a track for the cars extending through the dumper and having a portion of the track severed for rotation with the dumper. At one end of the dumper and positioned along the track on either side thereof there are provided fluid-actuated rams reciprocable along the track for moving the cars into and out of the dumper. Car engaging means are carried by said rams for movement transverse to the ram axes and into selective engagement with the car on the track and coacting therewith to move the car into the dumper. Means, e.g. hydraulic means, are provided for applying fluid under pressure to extend and retract the rams, respectively. Other means, e.g. fluid or hydraulic means, are also provided for selectively positioning the car engaging apparatus into and out of engagement with the cars in response to the position of the ram. In more specific embodiments, retractable abutments are provided in one or more positions along the track to engage and hold the car in position on the severed portion of the track, and after dumping to retract to permit passage of the car to position a full car in the dumper. In a preferred embodiment of the present invention, it is unnecessary to uncouple the cars in a train, rotary couplings being provided therebetween.

*General layout of apparatus*

Figure 1:
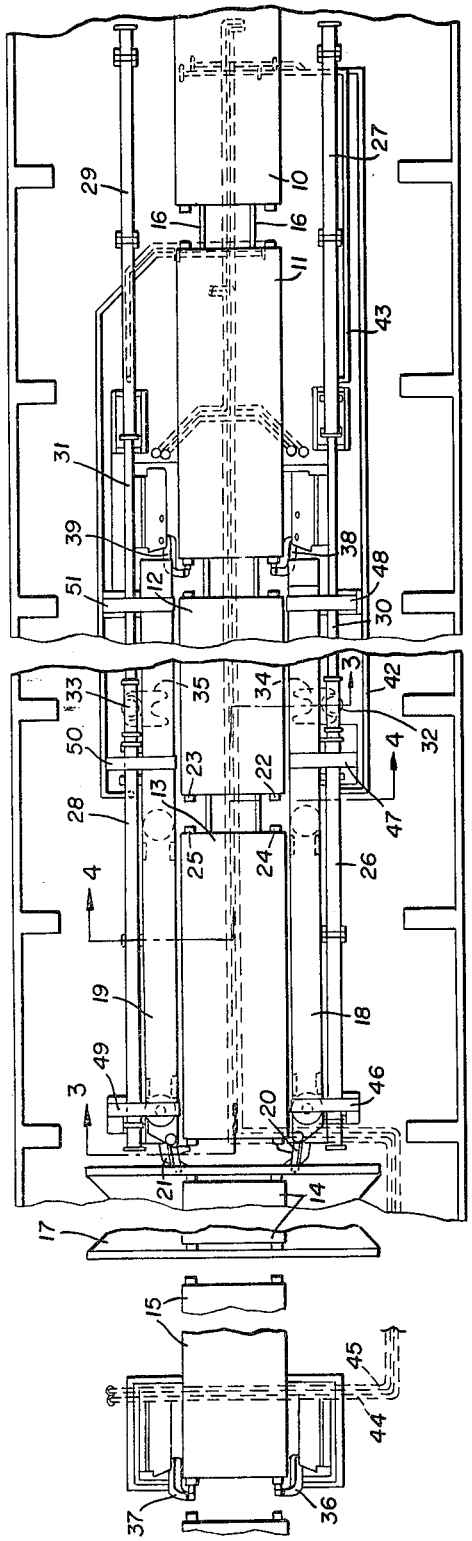
FIG. 1 is a semi-diagrammatic top plan view of railroad car advancing apparatus in accordance with the present invention.
Figure 2:
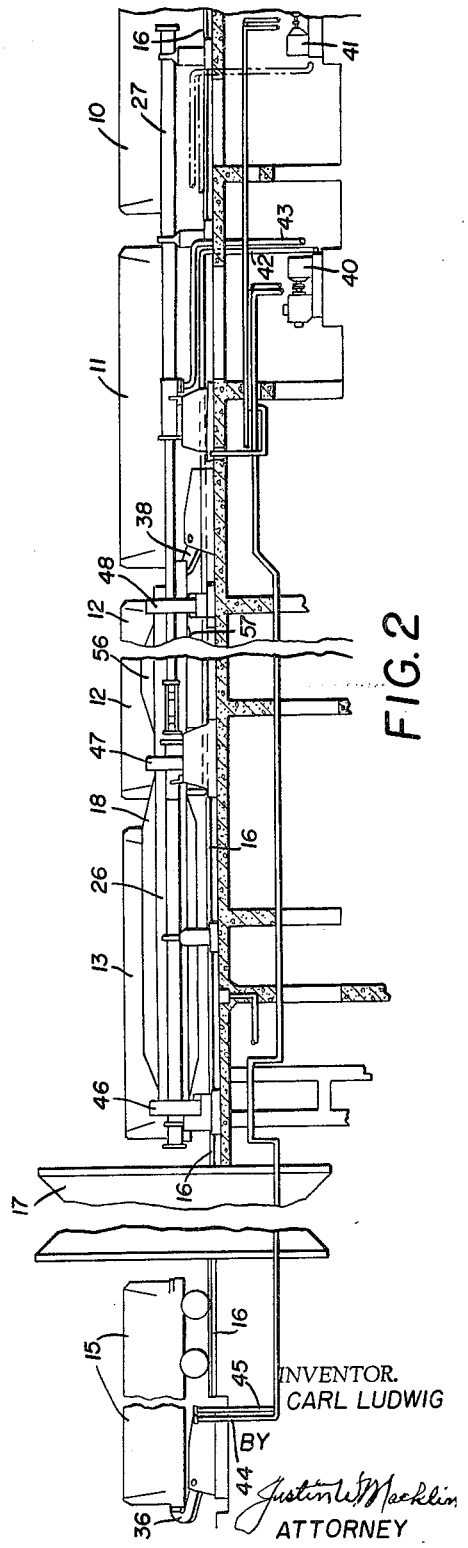
FIG. 2 is a side elevation of the apparatus of FIG. 1.

FIGS. 1 to 4, inclusive, show essential elements of the present system, each of which is shown in greater detail in subsequent figures, in a suitable arrangement for accomplishing the aforesaid objective. FIGS. 1 and 2 show top and side elevations, respectively, and FIGS. 3 and 4 are enlarged cross-sectional views taken on the lines 3—3 and 4—4 of FIG. 1, respectively. A plurality of railroad cars 10, 11, 12, 13, 14, and 15 are shown in outline representing a portion of a coupled train of gondola-type cars carried by track 16. Track 16 leads from right to left as shown into rotary dumper 17 diagrammatically represented, and continues thereafter to receive or run off cars emptied by dumper 17. As hereinafter explained, track 16 includes a severed portion within dumper 17 and mounted therein for rotation therewith. Disposed along each side of track 16 is a pair of car engaging and advancing carriages 18 and 19 mounted for synchronized movement parallel to track 16. Each is provided with retractable car engaging means 20 and 21, respectively, adapted to coact between cheek plates mounted at the confronting corners of each of said cars, for example cheek plates 22 and 23 of car 12 and cheek plates 24 and 25 of car 13. Driving means are provided in the form of pairs of long stroke, single acting, fluid-actuated rams 26–27 and 28–29 each of said pairs having common rods 30 and 31, respectively. In the preferred embodiment, rams 26, 27, 28 and 29 are single acting hydraulic cylinders disposed in push-pull relationship with respect to each of said rods 30 and 31, respectively. Pin means 32 and 33 carried by said rods 30 and 31, respectively, are adapted to coact with yokes 34 and 35 of carriages 18 and 19 to transmit thereto longitudinal movement of the rods 30 and 31 parallel to track 16.

Retractable car locating buffers 36 and 37 are disposed on opposite sides of track 16 at the discharge or run off end of dumper 17, and preferably include actuating means for initiating the cycle of dumping, righting, and car advancement as hereinafter more particularly described.

A second pair of retractable car positioning buffers 38 and 39 aid in locating the cars on track 16 in proper position for receipt of car engaging finger assemblies 20 and 21.

Buffers 36, 37, 38, and 39 are preferably hydraulically operated as are rams 26, 27, 28 and 29. To this end, hydraulic fluid lines are provided, flow of fluid therein being provided by pumps, e.g. pumps 40 and 41 which are responsive to electrical actuating means hereinafter more particularly described. For example, cylinder lines 42 and 43 regulate flow of fluid to and from cylinders 26 and 27, respectively. Lines 44 and 45 regulate the operation of the discharge end buffers 36 and 37.

Support for the rams 26 and 28, and for the carriage ways is provided by C-supports or pedestals 46, 47 and 48 on the left side, and C-supports or pedestals 49, 50 and 51 on the right side. FIG. 3 shows in somewhat greater detail pedestal 49 embracing and rigidly supporting cylinder 28 and upper carriage-way or channel 52, and lower carriage-way or channel 53 in which carriage 19 rides in response to movement of rod 31. Also shown is buffer 38 obliquely disposed with respect to track 16 so that in the retracted position of the buffer 38, car 14, shown in dotted lines, will pass buffer 38 unimpeded.

Carriage-ways 54 and 55 for carriage 18 in FIG. 3 are provided with stiffening webs 56 and 57, respectively. The attachment of carriage yoke 34 to rotatable pin 32 on ram 30 is also shown in FIG. 3.

FIG. 4 shows the greater detail of an enlarged cross-section taken on the line 4—4 of FIG. 1. Carriage 19 is shown in carriage-ways 52 and 53. Upper and lower stiffening webs 58 and 59, respectively, improve the strength of ways 52 and 53 in the region shown. Pedestal 47 supporting cylinder 26 and carriage-ways 54 and 55 is also shown.

The couplers between the railroad cars such as shown at 60 in FIG. 4 are preferably of the rotatable type of conventional design. Such couplers permit rotation of the cars about the longitudinal axis of the couplers to empty the contents of the car without uncoupling the cars and thus achieving considerable economy of time.

Suitable foundations are provided for support of the track 16, the pedestals, the rotary dumper, the buffers, etc. according to the exigencies of the particular installation.

The following sections of this specification discuss in greater detail the elements described in general terms above.

*Rotary car dumper*

Figure 6:
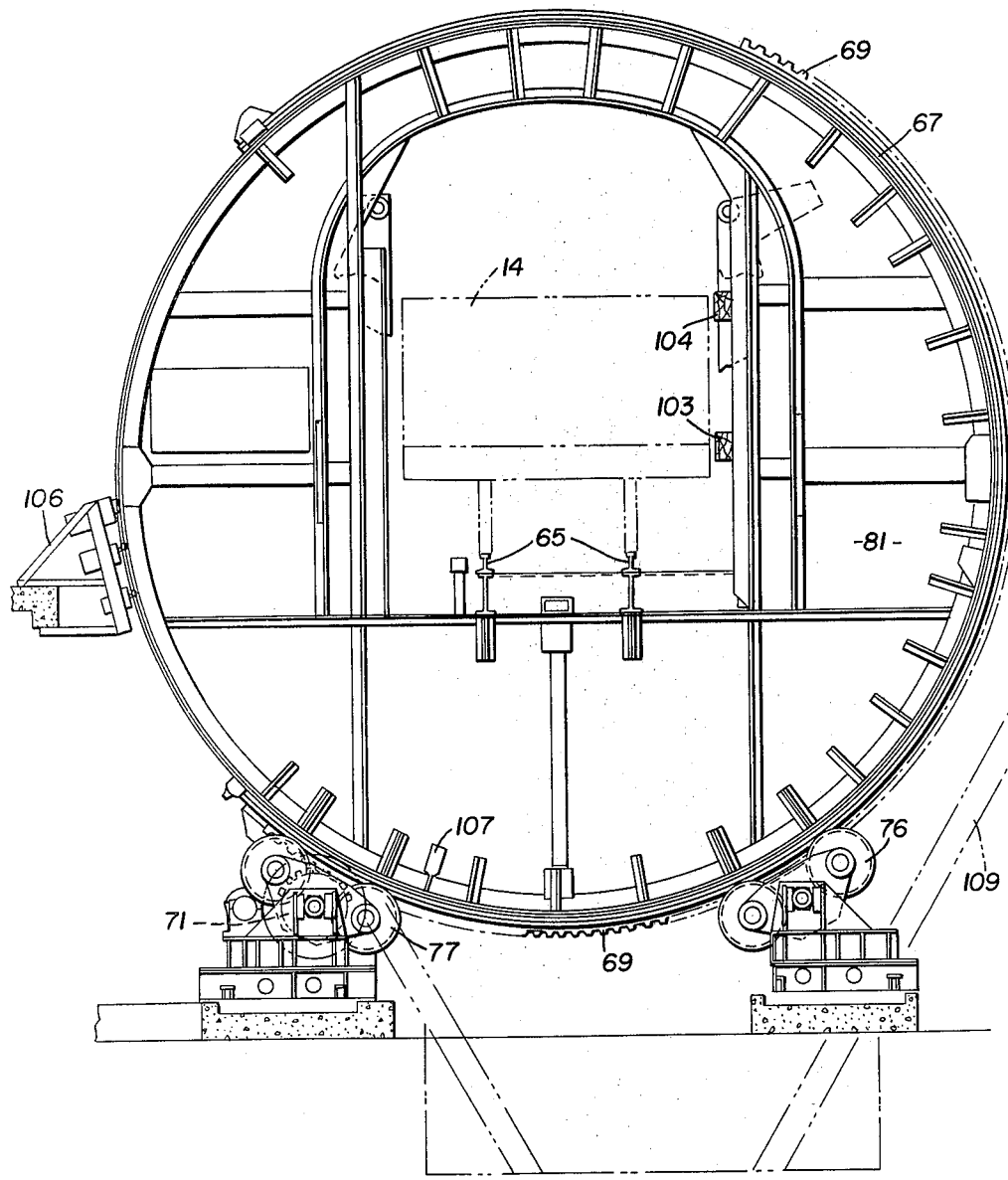
FIG. 6 is an end view of the cradle shown in FIG. 5.
Figure 7:
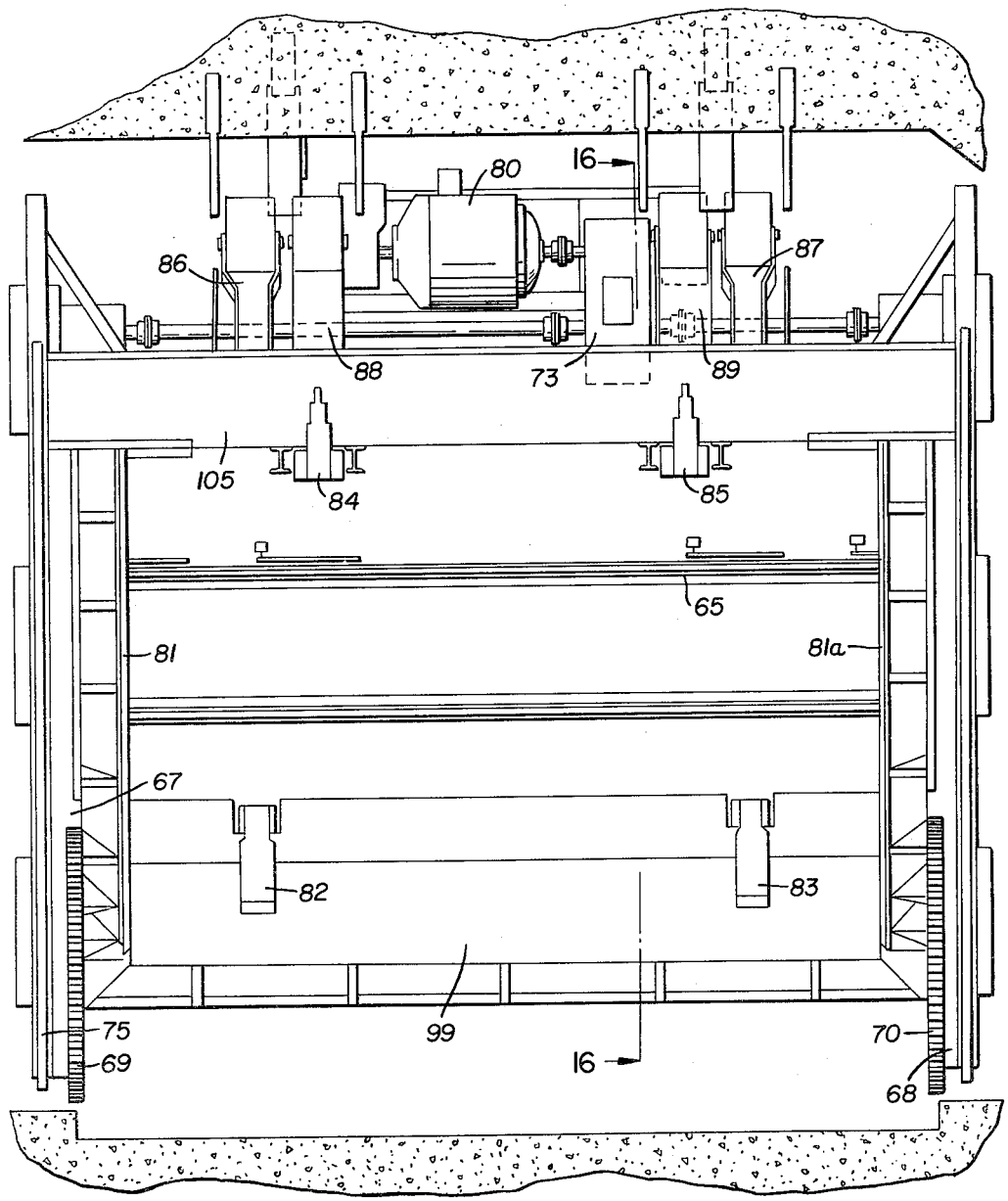
FIG. 7 is a top view of the cradle shown in FIGS. 5 and 6.
Figure 8:
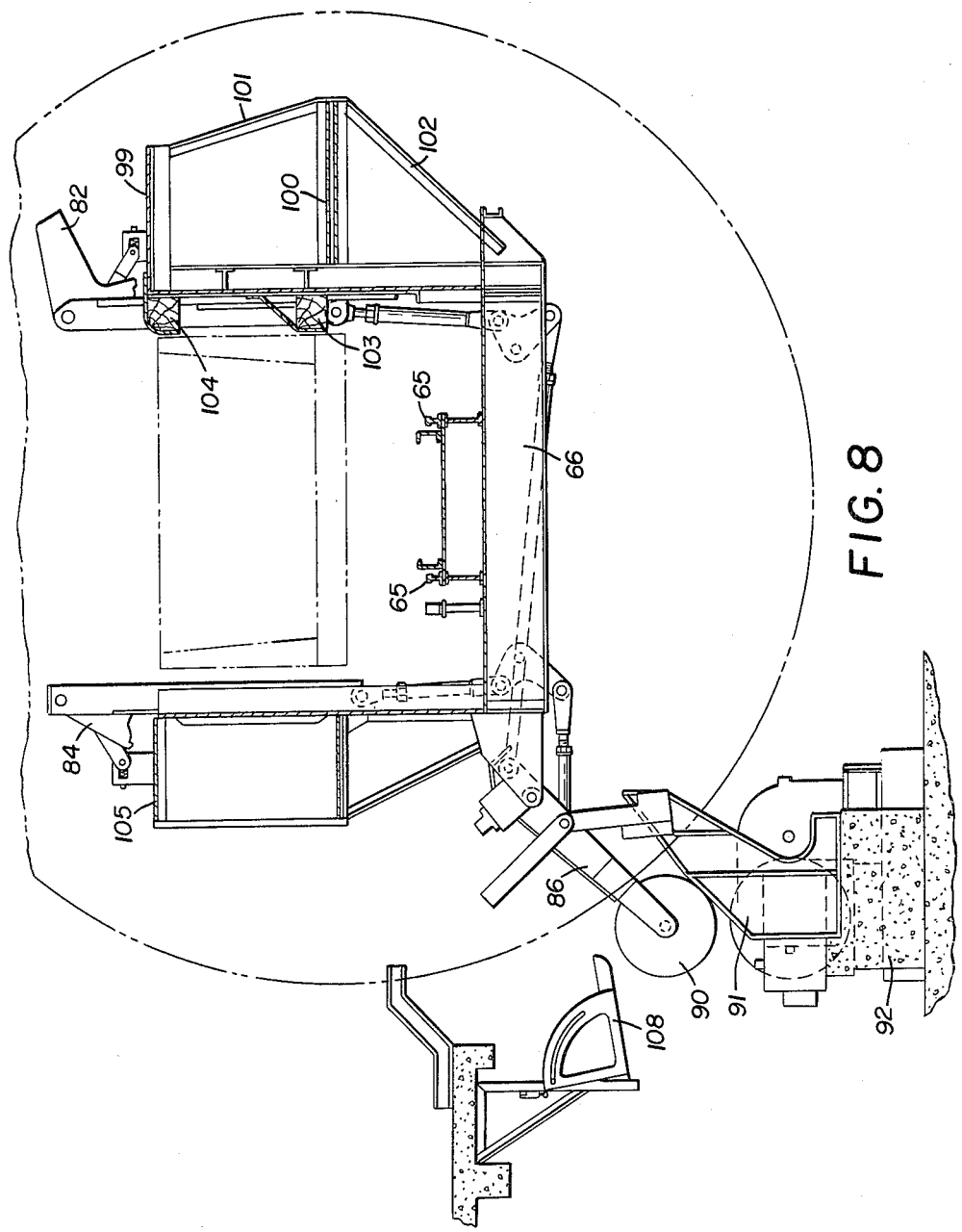
FIG. 8 is a cut-away view taken on the line 8—8 of FIG. 5 showing car clamping means.
Figure 12:
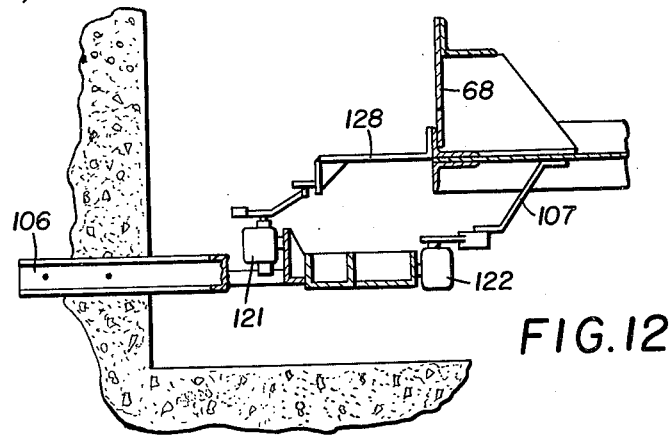
FIG. 12 is an enlarged fragmentary cross-sectional view taken on the line 12—12 of FIG. 10.
Figure 13:
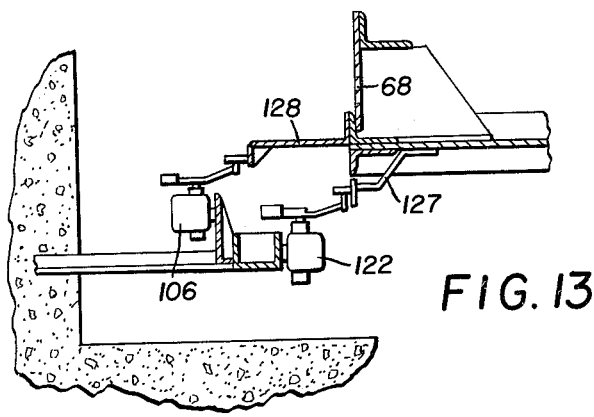
FIG. 13 is an enlarged fragmentary cross-sectional view taken on the line 13—13 of FIG. 10.
Figure 14:
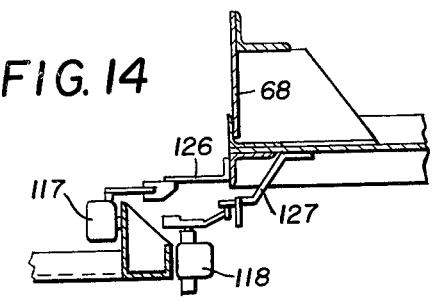
FIG. 14 is an enlarged cross-sectional view taken on the line 14—14 of FIG. 10.
Figure 11:
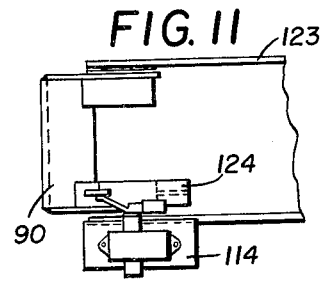
FIG. 11 is a fragmentary plan view taken on the line 11—11 of FIG. 10.

FIGS. 5, 6, 7 and 8 show the details of one form of rotary car dumper 17 useful in accordance herewith. As illustrated in FIGS. 5 to 8, a preferred form of car dumper includes a severed portion 65 of track 16 rigidly supported in an elongated box-shaped frame 66 open at the ends and top as best shown in FIGS. 5, 6 and 8. End rings 67 and 68 are mounted at each end of frame 66. End ring 67 at the run off end carries an arcuate gear tooth rack 69 adapted to be driven by drive pinion 71 actuated through gear box 72. The latter is driven from motor 80 actuating reducer 73 and line shaft 74. Rim 75 coacts with end ring guide rollers 76 and 77 which support and guide the run off end (left end as shown in FIG. 5) of the car dumping apparatus.

In like manner, end ring 68 at the approach end (right end as shown in FIG. 5) carries an arcuate rack 70 adapted to be driven by drive pinion 78 actuated through gear box 79 and driven in the same manner as above described for end ring 67 by motor 80. Each end ring is driven at the same rate to prevent imposition of distorting forces on frame 66.

As best shown in FIG. 6, each of end rings 67 and 68 carries a closure plate, such as plate 81 in end ring 67, and having an opening therein to pass the cars therethrough.

In order to prevent derailment of the car during dumping, car clamping means are provided, details of which are more clearly shown in FIGS. 16, 17, 18 and 19. Briefly, the improved clamping means of the present invention includes lever actuated hooks coacting with the frame and adapted to engage top longitudinal marginal edges of the car and exert a force in the direction of the track sufficient to retain the car on the track rails. One of the principal features of these clamps is their ability to be fully retracted so that a box car or a locomotive, for example, may pass through the dumper. The clamped position is shown in dotted lines in FIG. 16. Cam actuated counterweights coact through a series of links to actuate the edge engaging hooks and to exert the requisite clamping force.

For convenience the car securing or gripping clamp assemblies are identified as front and rear clamps, these adjectives connoting the front longitudinal car side edge over which the bulk material cascades in the dumping operation, and the rear longitudinal car side edge opposite. The direction of rotation as shown in the embodiment of FIG. 6 is clockwise. Accordingly, front clamps 82 and 83 are adapted to engage the front top edge of the car, and rear clamps 84 and 85 to engage the rear edge of the car. Each clamp is provided with a cam actuated counterweight lever arm. Thus, front clamps 82 and 83 are operated by cam actuated counterweighted lever arms 86 and 87, respectively. Rear clamps 84 and 85 are operated by cam actuated counterweighted lever arms 88 and 89, respectively.

FIG. 8 taken on the line 8—8 of FIG. 5 shows in limited detail lever arm 86 bearing at its free extremity counterweight 90 in coacting position with cam 91. Cam 91 is affixed to the foundation 92 and functions to release front clamp 82 from clamping engagement with the car as the dumper returns to its initial cycle position as shown in FIG. 8. In similar manner, cams 93, 94, and 95 coact with counterweights 96, 97, and 98, respectively, to actuate clamps 84, 85 and 83, respectively. The details of the clamps are more specifically set forth in the discussion of FIGS. 16–19.

To direct the bulk material as it cascades from the car during rotation, sill plate 99 is provided and extends between closure plate 81 affixed to end ring 67 and closure plate 87a affixed to end ring 68. When the car is tipped to a point which exceeds the angle of repose of the bulk material, sill 99 is in position to shield the mechanism below which might otherwise become fouled with material and guide the material toward hopper 109 below the dumper. Because of the load bearing on the dumping side of the frame 66, stiffening rib 100, held in position by a plurality of tension braces 101 and 102, is provided. Longitudinal wooden beams 103 and 104 support the upper and lower marginal edges of the dumping side of the car during the dumping process.

Rear deck 105 provides support for rear hook operating links as hereinafter described.

Controls bracket 106 carries a plurality of limit switches as hereinafter described, which switches are adapted to coact with switch actuating projections or knockers, e.g. knocker 107, for control of the dumping cycle. Counterweight interference switch 108 is a safety device adapted to stop the drive motor 80 if contacted by counterweight 90 after rotation has begun. If counterweight 90 does not follow the contour of cam 91, or improper clamping has otherwise occurred, the device must be stopped pending elimination of the cause for malfunction.

While a single car rotary dumper has been described herein, by enlarging the dumping apparatus, a plurality of cars may be handled simultaneously.

*Rotary car dumper controls*

As above disclosed, controls bracket 106 is positioned for coaction with limit switch actuating knockers, e.g. knocker 107, carried by end ring 67. The details of these controls is more clearly shown in FIGS. 9–15, inclusive. FIG. 9 is a diagrammatic layout showing the location of clamp interlock limit switches 114 and 115, both of which are normally open.

FIG. 10, taken on the line 10—10 of FIG. 9 and enlarged, shows details of the control switches and the means for actuating them and the position of the car dumping cradle 116 at 68° rotation. Frame 106 supports 6 limit switches mounted for coaction with end ring knockers. Thus, there are provided return slow down limit switch 117 for monitoring the return rate after dumping; dumping slow down limit switch 118, which is normally closed, for effecting speed control of dumper rotation as it approaches maximum rotation from normal. The next pair of limit switches encountered in clockwise direction is a return stop limit switch 119, normally closed, programmed to stop the drive motor 80 at zero rotation; and dumping stop limit switch 120, normally closed, programmed to stop the drive motor 80 at maximum rotation, e.g. 155°. Limit switch 121 is a car pusher interlock switch which is opened on clockwise rotation to deactivate the car pusher hydraulic ram pumps, and closed on return to permit the operation of the hydraulic ram pumps.

Clamp interlock limit switch 122 is normally closed and is opened by knocker 107 on end ring 68 at 68° of rotation. Clamp interlock limit switches 114 and 115, normally open, are carried on fulcrum pin brackets, attached to cradle 116, e.g. front clamp fulcrum pin bracket 123, and actuated by knockers carried at the captive extremities of levers 86 and 87, respectively, e.g. knocker 124 at the captive extremity 125 of arm 86.

Return slow down knocker 126 is attached to end ring 68 and intercepts limit switch 117 at 28° rotation in the embodiment shown in FIG. 10. Dumping slow down knocker 127 is positioned on end ring 68 and intercepts both normally closed dumping slow down limit switch 118 and dumping stop limit switch 120 at about 149° and 155° rotation, respectively. Return stop knocker 128 extends radially from end ring 68 and actuates limit switches 121 and 119 on return to close the pusher interlock switch 121 for initiating movement of the cars, and then stop limit switch 119 to cut out drive motor 80.

FIGS. 11, 12, 13 and 14 are cross sections taken on lines 11—11 12—12, 13—13 and 14—14 of FIG. 10 and show the relative disposition of the limit switches with the actuating knockers super-imposed.

Figure 15:
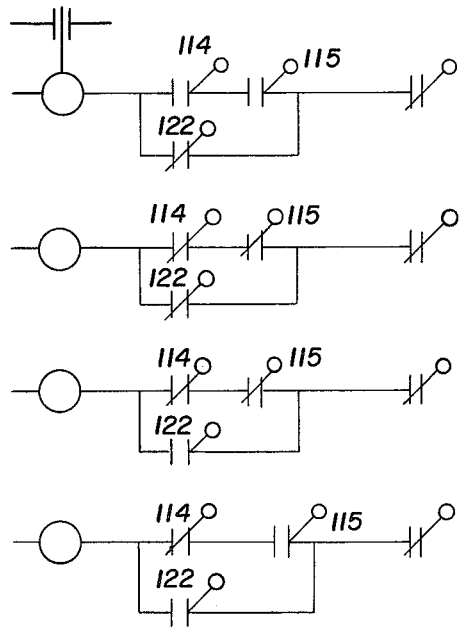
FIG. 15 is a schematic representation showing the condition of various switches at various stages in the dumping operation.
Figure 19:
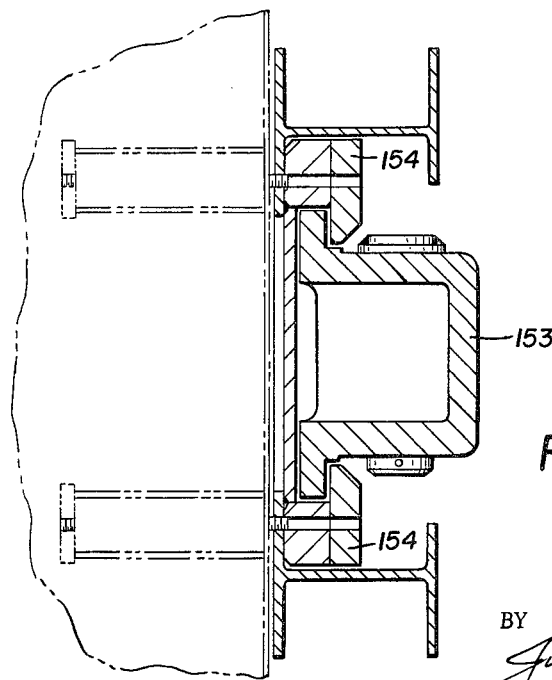
FIG. 19 is an enlarged sectional detail view taken on a plane indicated by the line 19—19 of FIG. 16.

FIG. 15 details the conditions of switches 122, and 114 and 115. At starting position, switch 122 is closed and carries the current up to about 24° rotation in the example illustrated, at which point switches 114 and 115 will close and take over the circuit. Switch 122 also remains closed up to 68° rotation. At 68°, switch 122 opens and the circuit closed by switches 114 and 115 only. Should one of the front clamps fail to seal on the car, either or both of switches 114 and 115 will fail to close and the dumping cycle stop at 68° when the circuit is opened by switch 122.

The control means shown in FIGS. 9 to 15 inclusive is illustrative of a preferred embodiment. However, it will be understood that other control means may be employed instead of that shown.

FIG. 10 also illustrates in dotted lines the position of the railroad car being emptied and resting against longitudinal wooden beams or rails 103 and 104. Sill plate 99 and apron or rib 100 coact in the dumping operation to shield mechanism from the cascading material and to guide the material into hopper 109. Full rotation in the example illustrated in FIG. 10 is 155° from normal and inverts the car sufficiently to empty the contents into hopper 109.

*Rotary car dumper clamps*

Referring more particularly to FIGS. 16, 17, 18 and 19, there is here shown in greater detail than shown in FIG. 8 the structure of a preferred car clamping mechanism for maintaining the car on the severed portion 65 of track 16 during dumping cycle. The clamps have been generally described above in connection with the description of FIG. 8. In a single car dumper, it is preferred to use a pair of front clamps and a pair of rear clamps positioned so as to engage the car in a vertical plane which passes through the car trucks, i.e. adjacent each end of the car. FIG. 16 is an enlarged, more detailed view taken on the line 16—16 of FIG. 7 showing front and rear clamp structure, and FIG. 17 is an elevation taken on the line 17—17 of FIG. 16.

Referring in particular to FIGS. 16 and 17, lever arms 89 and 87 carry rotatable counterweights 97 and 98 journalled for rotation about axles 135 and 136, respectively, at the free ends of arms 89 and 87. Counterweights 97 and 98, which are conveniently heavy steel wheels or concrete filled wheels, are disposed so that in the normal dumper position, they coact with cams 94 and 95, respectively, to maintain the clamps in open position. The contour of the cam surfaces is such that as the dumper is returned to normal position the clamps will be released. Fulcrum pin bracket plates 137 and 138 secured to frame 66 support fulcrum pin 141 for lever arm 89, and plates 139 and 140 (FIG. 17) also secured to frame 66 supply fulcrum pin 142 for lever arm 87.

Suitable axle support brackets, e.g. bracket 143 carried by frame 66, are provided for bell crank 144 for actuating rear hook 146 and for bell crank 145 for actuating front hook 147. Bell crank 144 is journalled for rotation about pin 148 and bell crank 145 is journalled for rotation about pin 149.

Bell crank 144 translates the cam-guided motion of lever arm 89 to the rear hook 146 through its connection to arm 89 by link 150. The other arm of crank 144 is pivotally connected through pin 151 and hook channel actuating link 152 to slidably mounted clamp arm or channel 153. Channel 153 reciprocates in suitable grooves or ways 154 attached to cradle 116, and in response to the motion of clamp actuating lever 89. Pivotal connection or pin 155 to hook 146 is provided at the upper extremity of channel 153. Hook advancing link 156 of predetermined length is pivotally attached to hook 146 at a point 158 intermediate pin 155 and the car engaging surface 157 of hook 146, and secured to the cradle 116 by means of anchor 159 which may be welded to the rear deck 105. The position of the rear hook 146 in car engaging and securing position is shown in dotted lines. In this position, link 156 is substantially horizontal, and may desirably be so disposed as to over-ride dead center for improved locking security of the car in the over-turned position.

Car securing front clamp 83 is of generally similar structure and operation to rear clamp 85. Here bell crank 145 translates the cam guided motion of lever arm 87 to the front car securing hook 147 through its connection to arm 87 by link 160. Link 160 is elongated to traverse the cradle 116 and operates bell crank 145 under tension rather than compression as is the case with crank operating link 150. Accordingly, bell crank 144 is disposed in frame 66 in an opposite attitude from bell crank 144, as illustrated in FIG. 16, and rotatably mounted on pin 149. The other arm of crank 145 is pivotally connected through pin 162 and hook channel actuating link 163 to slidably mounted from clamp arm or channel 164. Channel 164 reciprocates in suitable grooves or ways 165 attached to cradle 116, and in response to the motion of clamp actuating lever 87. Pivotal connection or pin 166 to front hook 147 is provided at the upper extremity of channel 164. Hook advancing link 167 of predetermined length is pivotally attached to hook 147 at a point 168 intermediate pin 166 and car engaging surface 169 of hook 147, and secured to the cradle 116 by means of anchor 170 which may be secured to the sill plate 99 by welding. The position of the front hook in car engaging and securing position is shown in dotted lines in FIG. 16. In this position, link 167 is substantially horizontal, and like link 156, may be arranged so as to over-ride dead center for improved locking security of the car in the over-turned position.

Front hook 147 is of generally heavier construction than hook 146 because of the stresses to which is submitted. Additionally, hook 147 is provided with a hood portion 171 which in the clamped and dumping position covers anchor 170 and protects it from damage.

The details of typical elevations of the clamps is illustrated in FIG. 18 showing an elevation of clamp 85, and FIG. 17 which is a typical enlarged cross-section taken on the line 19—19 of FIG. 10 showing the channel and its guides or ways. FIG. 18 shows bell crank pins 151, 148 and 172 located in bell crank 144. Pin 173 joining link 152 to channel 153 is also shown.

Like all of the clamp actuating counterweighted lever arms, lever arms is provided with a freely rotatable safety latch 173 and switch actuating knocker 174 mounted on latch pin 175 which also provides means for connecting link 150 to arm 89. Latch 173 is provided with a hook portion 176 and is desirably weighted as by weight 177 to make the latch readily responsive to gravity during rotation. Latch 173 and hook 176 is adapted to engage cleat 178 secured to frame 66 for coaction therewith to prevent clamp 85 from releasing its grip on the car when rotation has proceeded to a point where counterweight 97 would, in response to gravitational forces, tend to react and prematurely release clamp 85 controlled thereby.

In operation, then, as the cradle 116 is rotated clockwise, counterweight 97 traverses the control contour of cam 94 and moves toward the vertical center line pivoting lever 89 about fulcrum pin 141. Motion thus imparted to link 150 via pin 175 causes bell crank 144 to rotate counterclockwise lowering pin 151. Link 152 and its associated channel 153 through knuckle pin 173 is pulled downwardly. The forked end 179 of carrying pin 155 thus moves downwardly with hook 146 pivoted thereon being urged into clamping engagement with the car by link 156 bearing against anchor 159.

Clamp 83 is operated in a similar manner except that downward motion is obtained from lever arm 87 by connecting link 160 to pin 180 in an extension of lever 87. Thus, as lever arm rotates counter-clockwise about fulcrum pin 141, link 160 is placed under tension, forcing crank 145 to rotate in a clockwise direction when the apparatus is rotating to dump the car contents. Such action downwardly pulls link 163 and channel 164 connected thereto through knuckle pin 181 and brings car securing hook 147 into clamping relation with the upper edge of the car. All clamps are adapted to act simultaneously to clamp and release the car being dumped, and are thus effective in preventing derailment thereof in the tilted and inverted positions.

*Car pusher arm carriage*

FIGS. 20 to 26 inclusive show details of a preferred car pusher arm carriage, arm actuating apparatus, and carriage guiding means.

Figure 20:
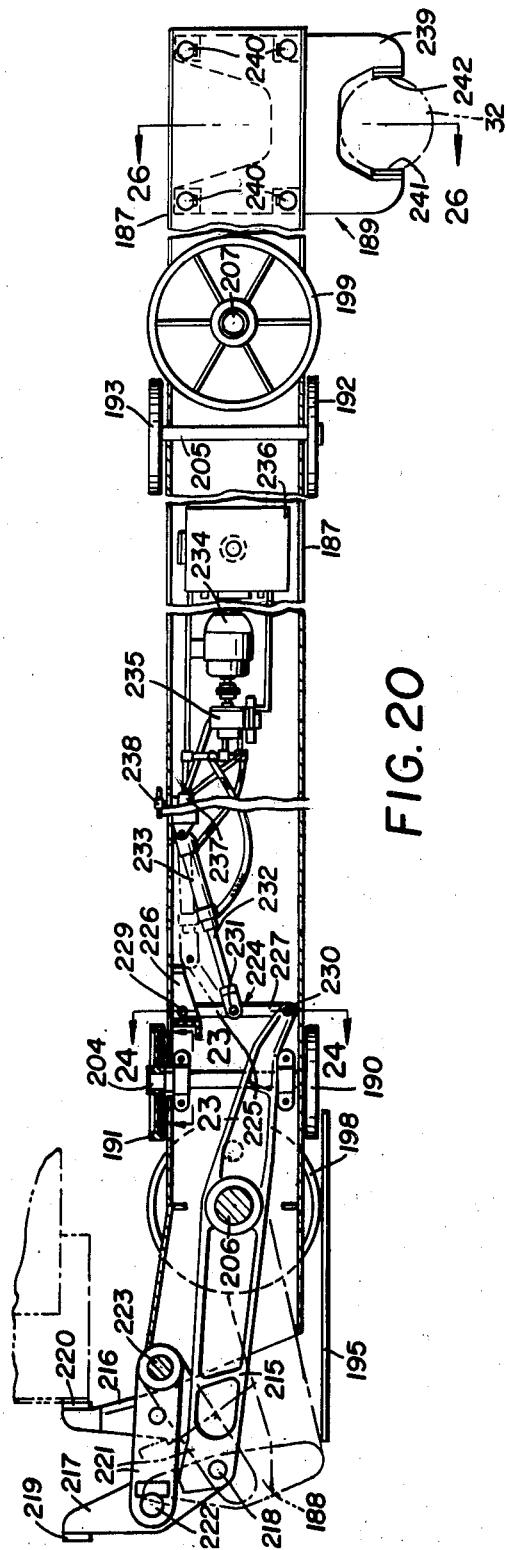
FIG. 20 is a fragmentary, partially cut-away top view of a car pusher arm carriage and operating mechanism.
Figure 21:
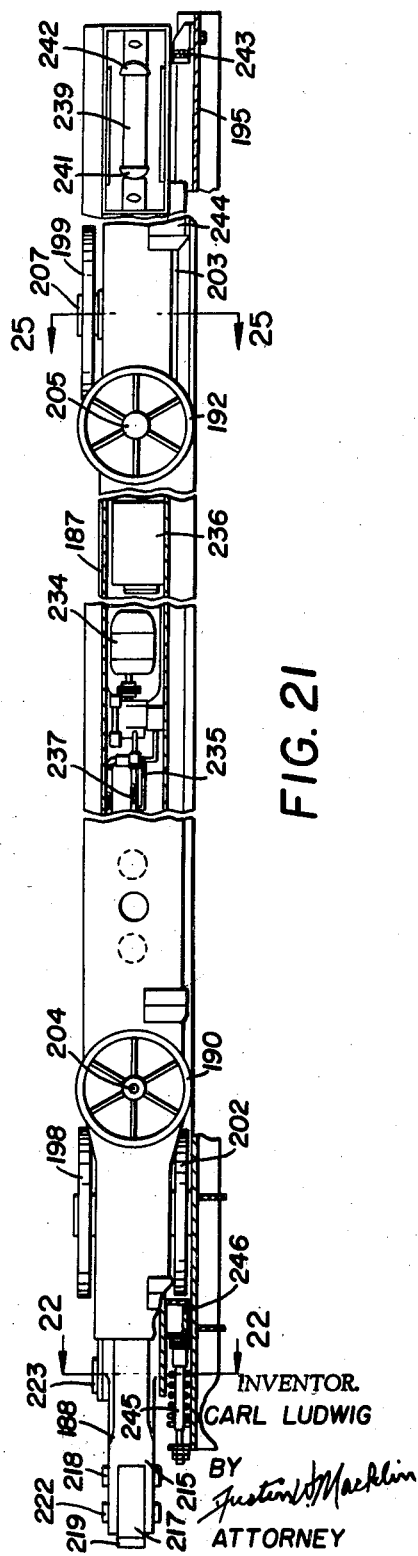
FIG. 21 is a fragmentary, partially cut-away side view of the car pusher arm carriage of FIG. 20.
Figure 22:
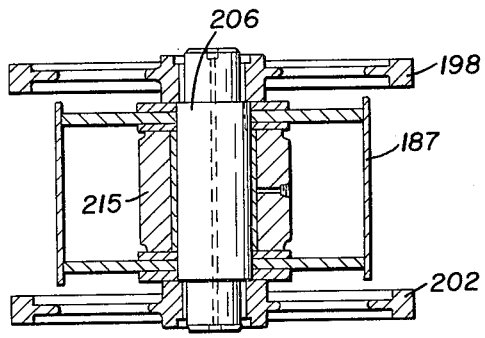
FIG. 22 is an enlarged cross-sectional view taken on a plane indicated by the line 22—22 of FIG. 21.

Carriage body 187 as shown in top view section FIG. 20 and side elevation FIG. 21 is conveniently of rigid box-type construction having car engaging means 188 at one extremity and means 189 for attachment to the driving means, e.g. the long stroke hydraulic rams, at the other extremity. Carriage body 187 is mounted on longitudinal movement along side track 16 on forward vertical wheels 190 and 191 and rear vertical wheels 192 and 193. Wheel pairs 190–191 and 192–193 are adapted to run in upper and lower flanged tracks or guides 194 and 195 (see FIG. 25). Sets of upper and lower flanged tracks or guides are disposed on each side of track 16. Flanges 196 and 197 on upper track way 194 are engageable by forward top horizontal stabilizer wheel 198 and by rear top horizontal stabilizer wheel 199. Flanges 200 and 201 on lower track way 195 are engagebale by forward lower horizontal stabilizer wheel 202 and by rear lower horizontal stabilizer wheel 203.

Figure 23:
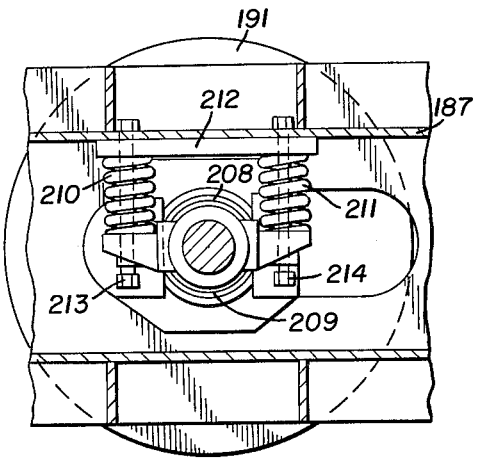
FIG. 23 is an enlarged cross-sectional view taken on the line 23—23 of FIG. 20.

Vertical wheel 190 and 191 are journalled for rotation on axle 204 secured forwardly in carriage body 187. Vertical wheels 192 and 193 are journalled for rotation on axle 205 secured rearwardly in carriage body 187. FIG. 23 taken on the line 23—23 of FIG. 20 shows details of one mode of resiliently supporting a vertical wheel axle in the carriage. Bearing block 208 and its mate block 209 are carried by compression springs 210 and 211 which in turn are restrained from lateral movement by spring plate 212 and bolts 213 and 214. In the embodiment shown in FIGS. 20–26, the bearing mounting for the rear wheels may be of simpler construction because of the difference in requirements for load carrying.

The horizontal wheel assemblies are desirably of sturdier construction than the vertical wheel assemblies due to the magnitude of lateral force couples encountered which are in excess of the vertical forces. Thus, forward horizontal stabilizing wheels 198 and 202 are journalled for rotation on shaft 206 supported forwardly in carriage body 187. Rearward horizontal stabilizing wheels 199 and 203 are journalled for rotation on shaft 207 supported rearwardly in carriage body 187.

The coaction between the flanged tracks 194 and 195 and the horizontal and vertical pairs of wheels is such that the apparatus is able to withstand force couples of great magnitude arising from engaging and pushing loaded railroad cars at a corner of the car. Other force couples arise from the application of the longitudinal driving force from the side of the carriage as will be hereinafter explained.

The forward end of carriage body 187 is provided with a retractable car engaging and pushing means generally indicated at 188. These means include an arm 215 journalled for rotation at a point intermediate its extremities on shaft 206. At its outer end portion, arm 215 is provided with a stationary laterally extending car engaging finger 216; and pivotally mounted at its outer extremity, a movable laterally extending car engaging finger 217 secured to arm 215 by pin 218. Fingers 216 and 217 at their distal extremities are provided with oppositely directed face plates 219 and 220, respectively, adapted to be brought into engagement with the cheek plates at the confronting corners of a pair of coupled-together railroad cars.

Intermediate its extremities, movable finger 217 is pivotally connected to one end of connecting link 221 by means of pin 222. Link 221 is, in turn, pivotally connected to the front end of carriage body 187 by pin 223.

The solid lines in FIG. 20 illustrate pusher means 188 in car engaging position. In dotted lines, pusher means 188 is shown in retracted position. Engagement and retraction of the car engaging fingers is effected by any suitable means, preferably the hydraulic means shown in FIG. 20, operating on a toggle joint 224.

Figure 24:
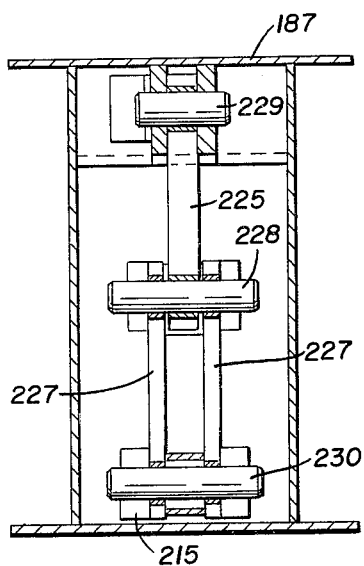
FIG. 24 is an enlarged cross-sectional view taken on the line 24—24 of FIG. 20.
Figure 25:
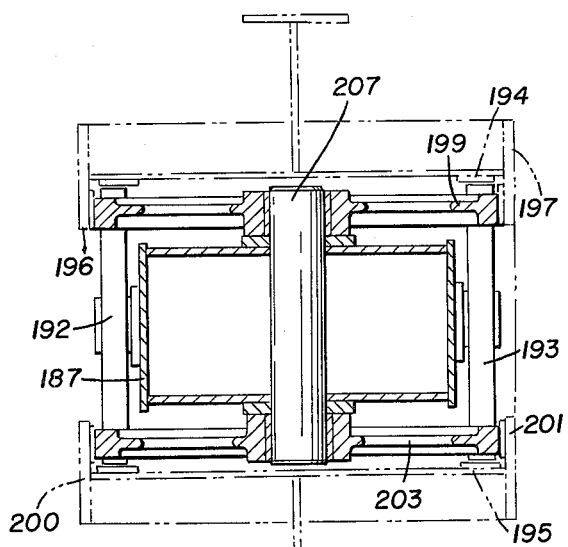
FIG. 25 is a cross-sectional view taken on the line 25—25 of FIG. 21.

As shown in FIGS. 21 and 24, toggle joint 224 is composed of toggle link 225 secured to carriage body 187 by bracket 226 and pin 229, and joined to toggle link 227 with knee pin 228. Toggle link 227 is joined at its other end to the proximal extremity of pusher arm 215 by pin 230. Knee pin 228 is also secured to clevis 231 which is actuated by piston rod 232 extending from a double-acting hydraulic cylinder 233. Toggle 224 is adapted to coact with hydraulically operated rod 232 in such a manner as to over-ride dead center and thus insure self locking of the pusher arm 215 in case of hydraulic pressure or pump failure.

Motor 234 drives hydraulic fluid pump 235 which supplies fluid from reservoir tank 236 to the hydraulic cylinder 233 to actuate rod 232. Valve 237 determines whether the actuation is one of retraction or extension of the fingers 216 and 217. Actuation of valve 237 is by means of knockers spaced along track 16 (not shown) operating trip 238.

Figure 26:
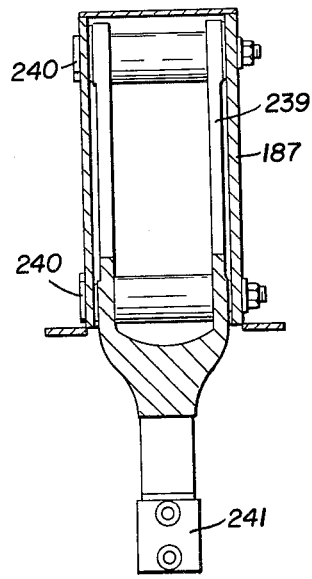
FIG. 26 is a detail partly in section taken on the line 26—26 of FIG. 20.
Figure 30:
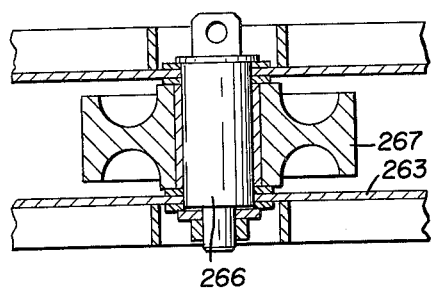
FIG. 30 is an enlarged cross-sectional view taken on the line 30—30 of FIG. 27.
Figure 29:
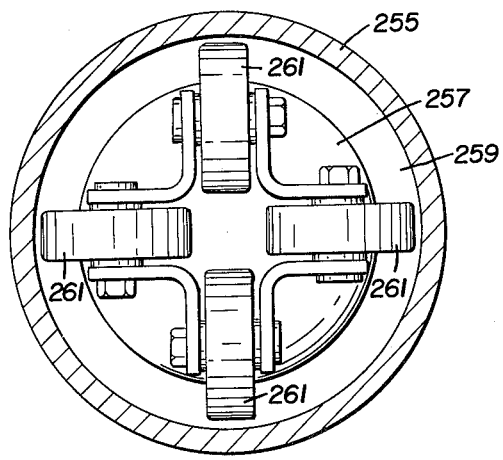
FIG. 29 is an enlarged detail of the ram guide.

To transfer the motion of the long stroke hydraulic ram to the adjacent pusher arm carriage, carriage body 187 is provided with attachment means 189 which in the preferred embodiment shown include a yoke 239 secured to frame 187 as by multiple anchoring pins 240. The laterally extending arms of yoke 239 are provided at their extremities and in confronting relation with face plates 241 and 242 which are adapted to engage rotary pin 32 on the hydraulic ram rod as hereinafter more particularly described. These details are shown in FIGS. 20 and 26.

To limit the travel of the carriage shown in FIGS. 20 and 21, stop 243 and carriage bumper 244 are provided. Stop 243 is secured to the lower carriage track 195 and bumper 244 is affixed to carriage body 187 and so disposed as to engage retract stop 243 at the return limit of its travel. The length of the travel for a conventional ore-carrying railroad car is 34′-0″. Forward travel of the carriage is limited by spring loaded shock absorbing stop 245 affixed to lower track 195 and adapted to coact with bumper 246 on carriage body 187 to arrest forward travel of the car pusher assembly.

The foregoing description of the car pusher arm carriage has been limited for convenience to the discussion of but one such assembly. In the preferred system of the present invention, duplicate carriages are provided for the right and left sides, respectively, of the track 16. The travel may be adjusted as desired, and, although suggested herein as equivalent to one car, length may be one or more car lengths depending on the capacity, or number, of the rotary car dumper.

*Hydraulic ram driving means*

As indicated above, the car pushing carriage of the present invention is driven by a pair of long stroke single acting hydraulic ram systems disposed on either side of the track 16 and adapted to coact in unison to move car engaging and propelling carriages on each side of a given car or string of cars. Details of a preferred form of hydraulic ram driving means are shown in FIGS. 27 through 30.

In general, a hydraulically actuated reciprocable motion transferring or travelling pin-carriage is secured between opposing single acting hydraulic ram or piston rods arranged to operate in push-pull manner, the pin being adapted to engage yoke 239 on carriage body 187 above described. This system is duplicated on the opposite side of the track and interconnected to co-operate in unison.

Figure 28:
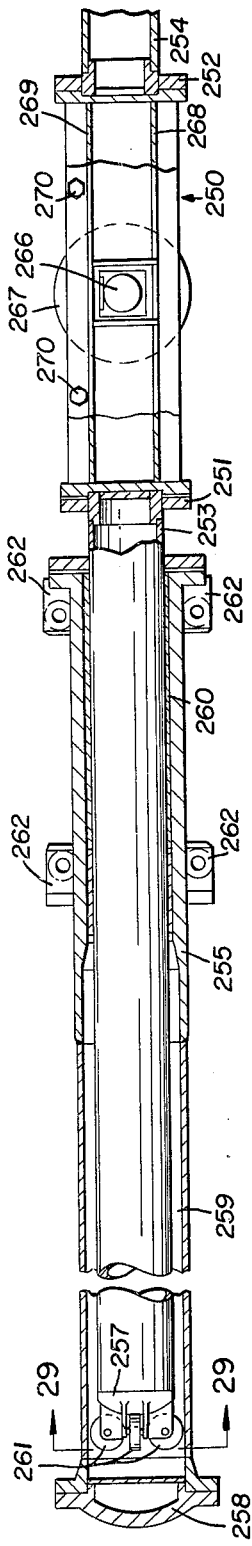
FIG. 28 is an axial section partly in elevation indicated by the line 28—28 of FIG. 27.
Figure 27:
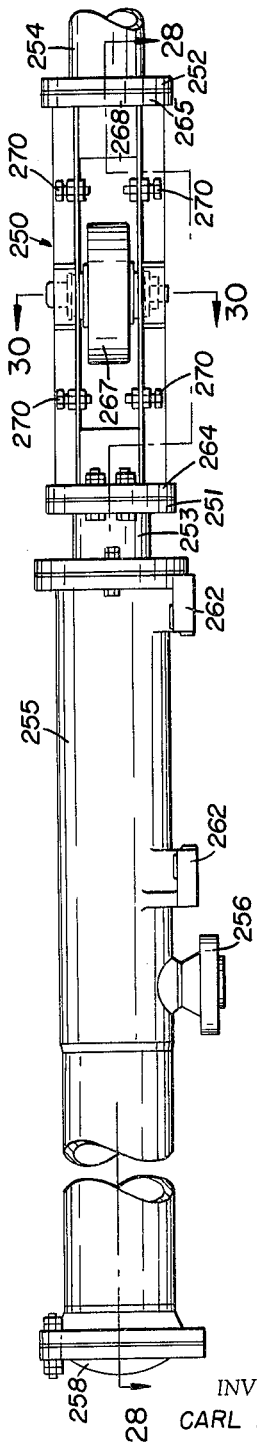
FIG. 27 is a side elevation of an hydraulic ram useful in accordance with the present invention.

More specifically then, FIG. 27 shows a side elevation of a pin-carriage assembly generally indicated at 250 secured to the confronting flanged ends 251 and 252 of piston rods 253 and 254, respectively. Since the piston rod-cylinder assemblies for actuating pin-carriage 250 are identical, only one is shown in FIGS. 27 and 28. Accordingly, piston rod 253 is telescopically mounted in long stroke hydraulic cylinder 255 provided with fluid inlet-outlet 256 communicating with the portion of cylinder 255 including piston head 257. Cylinder head 258 seals the fluid-receiving compartment 259 in cylinder 255.

The opposite end of cylinder 255 includes a suitable stuffing box portion 260 to prevent leakage of fluid along piston rod 253.

Since the stroke of rod 253 is equivalent to the length of a railroad car, e.g. 34 feet, it is convenient to supply stabilizer means at the piston head 257. In the embodiment shown in FIGS. 28 and 30, these means include four quadrant wheels 261 mounted for rotation in planes at right angles to each other, respectively. Wheels 261 are adapted to engage the inner wall of cylinder 255 and effect a stabilizing action on rod 253.

A plurality of cylinder anchoring feet 262 are provided for securing the ram assembly to the foundation.

Pin-carriage 250 is secured to the distal extremities of confronting piston rods 253 and 254 faced with flanges 251 and 252, respectively. Pin-carriage body 263 is of generally box-like construction, having flanges 264 and 265 at its extremities adapted to be secured to piston rod flanges 251 and 252, respectively. Centrally of carriage body 263, there is provided a vertically disposed pin axle 266, best shown in FIG. 29, and cylindrical pin 267 journalled for rotation thereon. Side walls 268 and 269 are cut out to provide an opening through pin-carriage body 263 to receive the arms of laterally extending yoke 239 from car pusher carriage body 187 shown in FIGS. 20–26. Yoke 239 is secured to the travelling pin-carriage 250 by set screws 270.

As indicated above, the long stroke hydraulic rams useful as the driving means for the car pusher carriage of FIG. 20 are desirably provided in confronting, oppositely acting pairs, one such pair being disposed on each side of the track 16 as diagrammatically shown in FIG. 1. To operate each such pair, then, fluid, e.g. hydraulic oil, is pumped according to electrically programmed sequence from the fluid-receiving compartment 259 to the corresponding fluid-receiving compartment of the coacting ram (not shown) by means of hydraulic pump 40 (FIG. 2), and back again. This causes pin-carriage 250 (FIG. 27) to traverse a stroke of 34 feet, i.e. sufficient to advance a connected train of 34′ long ore carrying cars one car length for emplacement of a full car in rotary dumper 17 (FIG. 1) and to return to pick up a next succeeding car.

Car pusher carriage and hydraulic ram controls

FIGS. 31–35 show the location in the car pusher and ram assemblies of electric limit switches used in controlling the sequence of automatic operations and the means for actuating them.

Figure 31:
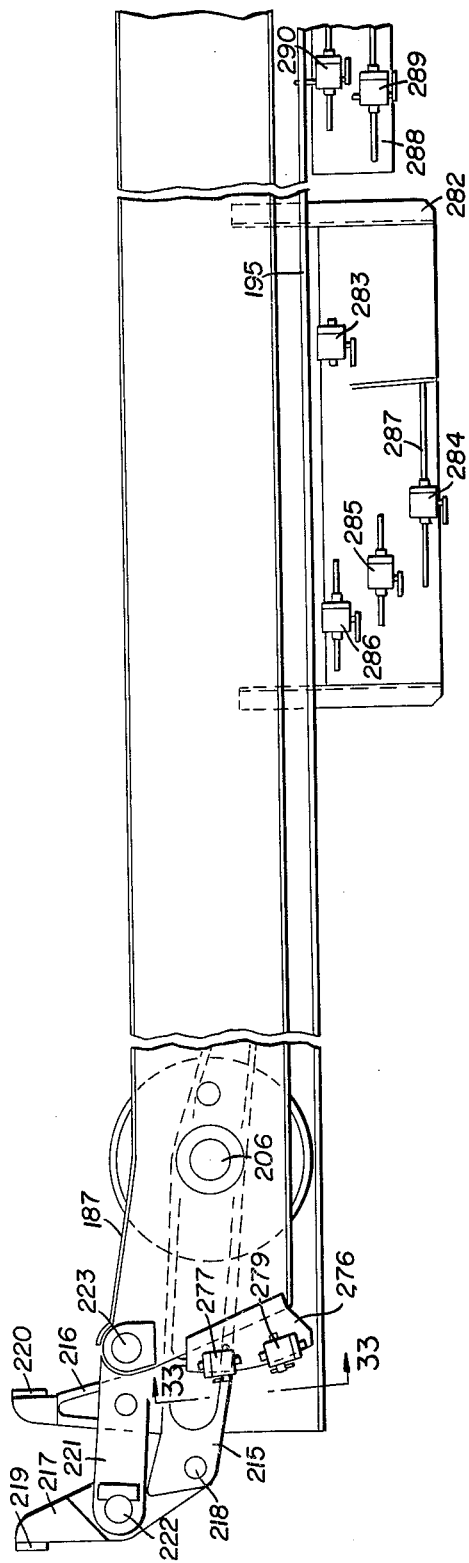
FIG. 31 is a diagrammatic elevation of the carriage shown in FIGS. 20-26 showing the location of electrical control means.
Figure 33:
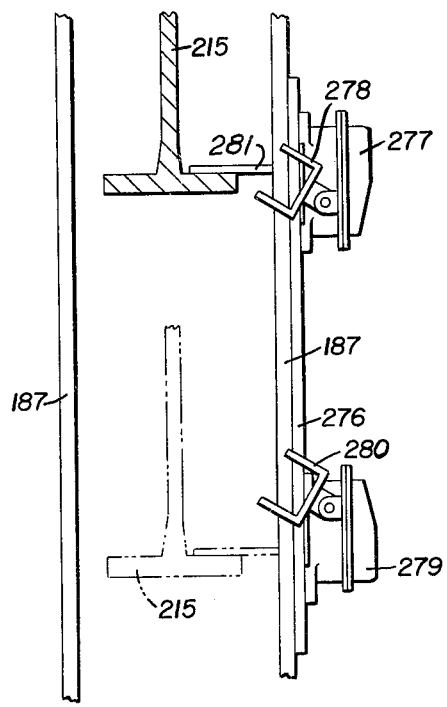
FIG. 33 is an enlarged detail taken on the line 33—33 of FIG. 31.

FIGS. 31 and 33 show diagrammatically the fingers 217 and 216 actuated by arm 215 at the forward end of the car pusher carriage such as shown in FIGS. 20–26. Carriage body 187 is provided at its leading edge with a bracket plate 276 on which are conveniently mounted buffer retract limit switch 277 having fork or trip 278, and limit switch 279 having fork or trip 280. Switch 279 performs three functions: (1) It actuates the carriage retraction by reversing the operation of the hydraulic rams to pull the car pusher carriage back to pick up the next car. (2) It actuates the car dumper. (3) It stops pump 234 (FIG. 20) in its operation to retract arm 215 and disengage the fingers 216 and 217 from the car. These limit switches 277 and 279 are actuated by switch actuating means such as knocker 281 secured to arm 215.

Supported on a bracket 282 secured to lower flanged track or guide 195 under the car pusher carriage of FIG. 20 are several limit switches so disposed as to be actuated by knockers carried by pin-carriage 250 (FIG. 27). Proceeding in the direction of approach to the dumper 17 (FIG. 1) and with reference to FIGS. 31, 32 and 35, the first limit switch 283 initiates deceleration of the ram-carriage assembly on the car pushing operation. Switch 284 actuates a metering pump to aid in deceleration. Operation of limit switch 285 actuates buffer engaging means, and actuation of limit switch 286 stops the forward motion of the carriage-ram assembly. Adjustable switch mounting means, such as slot 287 in bracket 282, are provided for proper adjustment of the location of limit switches 287, 285, 286 and 283.

Figure 32:
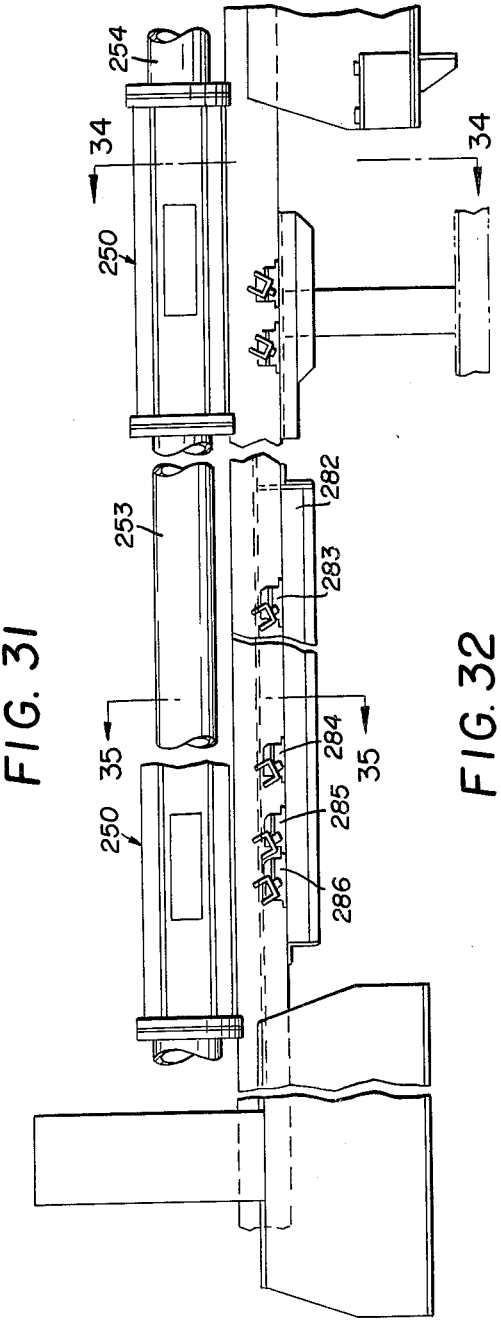
FIG. 32 is a partial diagrammatic side view of the ram and guide shown in FIGS. 27-30 showing the location of electrical control means.
Figure 34:
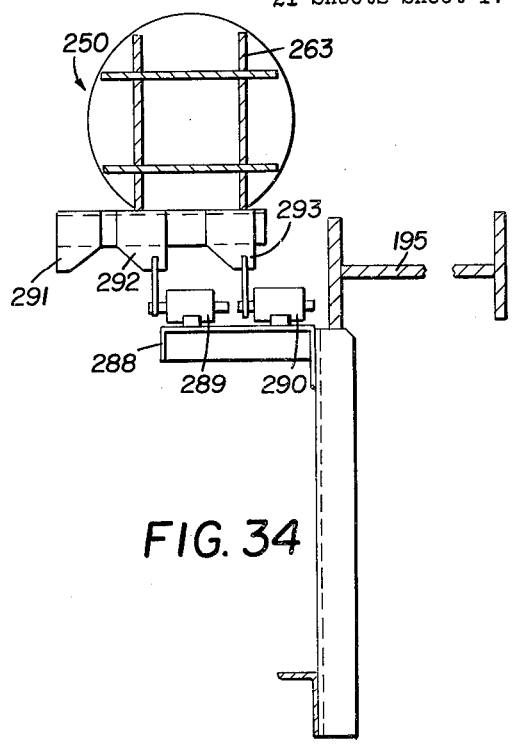
FIG. 34 is a detail partly in section taken at the line 34—34 of FIG. 32.

In like manner, for control of the retraction of the car pusher carriage, other limit switches are provided. Thus, also mounted on a bracket 288 disposed for coaction with the pin-carriage assembly 250, are limit switch 289 and limit switch 290, details of which are shown in FIGS. 31, 32 and 34. Proceeding in the direction of retraction, i.e. away from the rotary dumper 17 (FIG. 1), the first switch encountered (289) initiates deceleration of the carriage-ram assembly, and switch 290 terminates the retraction operation by stopping pump 40, and simultaneously actuates the pump 234 in the pusher arm carriage for engaging the next succeeding car.

Limit switch actuating projections, or knockers 291, 292 and 293 are mounted for operative engagement with the foregoing limit switches. Thus, in the course of the stroke of the pin-carriage assembly 250, knocker 291 will actuate limit switch 294; knocker 292 will actuate limit switches 285 and 289; and knocker 293 will actuate switches 286, 283 and 290.

The sequence of operations effected by these and other control devices in the system will be discussed in detail in a later section.

Car buffers

In the car-unloading system of the present invention, retractable car arresting and positioning buffers or bumpers are disposed in pairs on opposite sides of the track 16, and preferably at two positions along the track, one pair following the rotary car dumper 17 (FIG. 1) and the other preceding it. The pair following the dumper 17 (i.e. buffers 36 and 37, FIG. 1) aid in holding the empty train cars in position, and to prevent slippage in response to a grade following the dumper at the runoff portion. Buffers 38 and 39, FIG. 1 engage and hold the train while the pushing apparatus releases and retracts to register and pick up a car for the next cycle. Concurrent with this, the dumper is actuated spilling the car contents with the train restrained by buffers 38 and 39. Use of buffers in this manner has been found to aid in shortening the cycle.

Details of a typical buffer are shown in FIGS. 36–39, inclusive, together with the position of control switches and actuators therefor.

As shown in FIGS. 36–39, there is provided a buffer body base 300 adapted to be securely anchored to the apparatus foundation. Buffer body portion 301 mounted on base 300 is adapted to support the buffer arm 302, and is conveniently disposed at an angle with respect to the track 16 and the supporting base. Buffer arm 302 is mounted for rotation on buffer pin or axle 303 secured in body 301, and because of the angular disposition of the supporting body 301, moves in a plane which intersects a cheek plate at the lower corner of a railroad car and causing the car to be positioned at a predetermined point on track 16. In the retracted position, rotation in said plane disposes the buffer arm 302 such that the car may move by the buffer unimpeded.

Buffer arm 302 is a lever which is conveniently of generally M-shape pivoted at the intersection of the internal legs corresponding to axle or buffer pin 303. Inner leg or arm 304 supports outer leg 305 to which is secured by any suitable means, a bumper plate 306 adapted to engage the car cheek plate. The other inner leg 307 of the M is contained within the body 301 and supports toggle leg 308.

Retraction of buffer arm 302 from the car engaging position may be effected by any suitable means, although preferably the hydraulic means shown in FIG. 37 operating on toggle joint 310.

Figure 38:
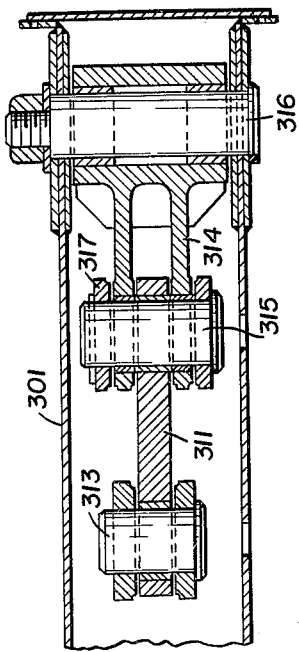
FIG. 38 is an enlarged cross-sectional view taken on the line 38—38 of FIG. 37.

As shown in FIGS. 37 and 38, toggle joint 310, like toggle joint 224 (FIG. 20), is composed of toggle link 311 secured to buffer body 301 by bracket 312 and pin 313, and jointed to toggle link 314 with knee pin 315. Toggle link 314 is jointed at its other end to toggle leg 308 by pin 316. Knee pin 315 is also secured to clevis 317 which is actuated by piston rod 318 extending from a double acting hydraulic cylinder 319. Hydraulic cylinder 319 is pivotably secured to body 301 by hinge bracket 320 and hinge pin 321. Toggle 310 and hydraulic cylinder 319 are so arranged with piston rod 318 to coact to overtravel dead center when rod 318 is fully extended to afford a self-locking effect for the buffer arm in the car engaging position. Thus, when the hydraulic cylinder 319 is actuated in response to programmed signals, buffer arm 302 is brought into engagement with the car corner or retracted therefrom through the action of toggle 310.

Bracket 322 secured to body 301 carries limit switches 323 and 324 adapted to control buffer action. Switch 323 actuates the mechanism for retracting the pusher arm assembly 188 (FIG. 20) and stops the movement of the buffer 302 at the engaged position. Switch 324 de-energizes the buffer retraction mechanism at the maximum retraction point and activates the pushing interlock, i.e. the buffer being in retracted position, the car pushing mechanism may now be activated through the interlock with limit switch 324. The limit switch actuating means include a pair of adjustable knockers 325 and 326 for actuating switches 322 and 323, respectively, supported by buffer arm 302 and movable therewith.

Layout of limit switch controls, hydraulic system and cycle operation

Figure 40:
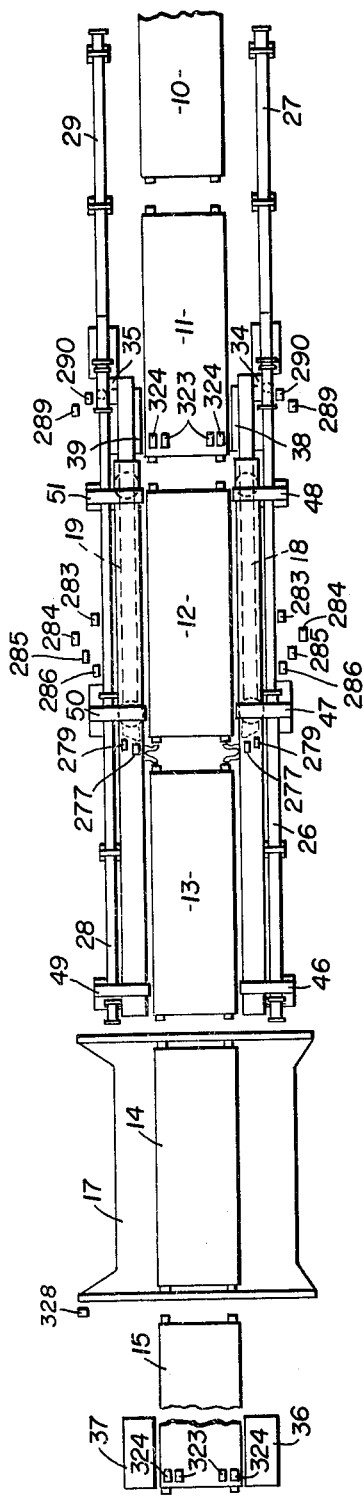
FIG. 40 is a diagrammatic representation of a preferred form of apparatus in accordance with this invention showing the location of various limit switches for one embodiment of programmable automatic operation.

FIG. 40 shows a diagrammatic layout of the principal units described above assembled for coaction in a programmed manner for emptying the bulk contents of a series of railroad cars serially. In FIG. 40, the numbers ascribed to limit switches in the previous figures have been used. The limit switches controlling the car dumper unit itself have been shown and their operation described supra.

Figure 41:
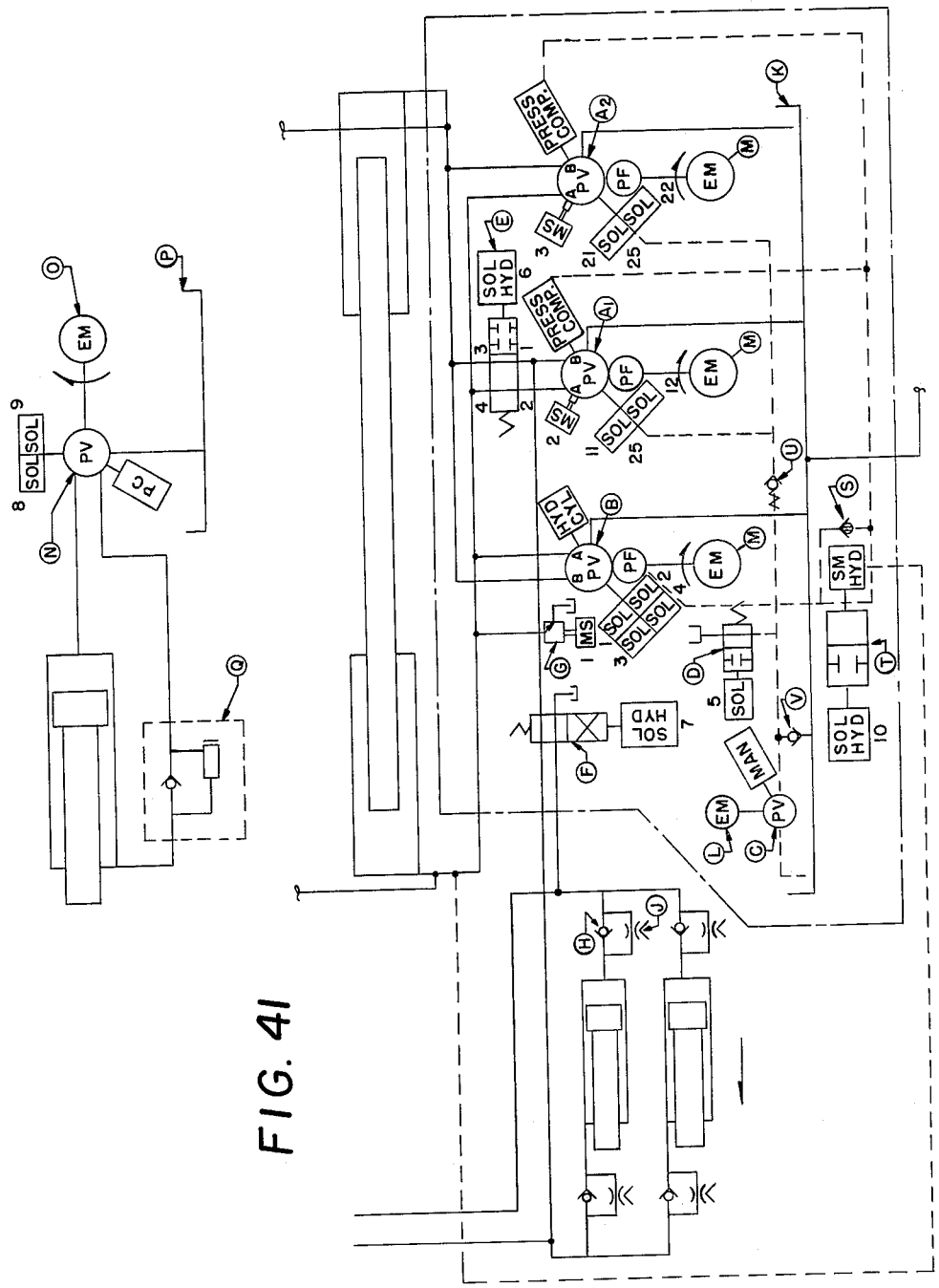
FIG. 41 is a schematic hydraulic layout for a hydraulically operated car pusher in accordance herewith, showing control solenoids and valves.

FIG. 41 shows hydraulic schematics for the car pusher and carriage units together with the location of solenoids which are activated by the various limit switches above described. In FIG. 41, $A_1$ and $A_2$ are pumps actuated by a three-position solenoid control and a pressure compensating control. B is a pump with a five-position volume control. C is a pump with a hand-wheel manual volume control. D is a two-way valve operated by solenoid 5 with a spring returned plunger. E is a four-way valve with a solenoid 6 pilot operator and spring-returned plunger.

When solenoid 6 is de-energized, ports 1 and 3 are connected as are 2 and 4. When energized, all ports are closed.

F is a four-way valve solenoid pilot operated with a spring-returned plunger. G is an oil-gear reverse flow adjustable pressure relief valve with a micro-switch 1. H represents check valves for each of the buffers. J are globe valves for synchronizing buffer speed. K and P are oil reservoirs. L, M, and O are motors. N is a pump. Q is a foot valve. S and V are check valves. T is a solenoid pilot-operated two-way valve pressure sensitive with a normally open plunger. U and W are relief valves.

In operation, then, and referring to FIGS. 40 and 41, at the beginning of a cycle, the operator will position the carriage manually and have the four buffers 36–39 in retracted position, and the pusher arm assembly 21 engaged in position for a cycle. The selector switch is turned to automatic cycle activating solenoid 8 on pump N which will maintain pressure on the blind end of the pusher arm cylinder 233 (FIG. 20) thus holding the arm in position.

Forward motion of the pusher will not start until limit switch 328 located on dumper 17 is actuated. When thus tripped, solenoids 1, 11 and 21 will be energized directing the flow of hydraulic fluid from the three variable delivery pumps B, A$_1$ and A$_2$ out of port B. The train of cars will then accelerate to final velocity and continue at that speed until knocker 293 (FIG. 35) contacts limit switch 283.

Limit switch will actuate the deceleration cycle by de-energizing solenoids 1, 11, and 21 and energizing solenoids 2 and 10. The speed of the train will then drop rapidly until pressure in the system reaches a predetermined value, at which value pre-set micro-switch 1 on valve C will trip.

This electrical signal will energize solenoids 11 and 21 thus reactivating pumps A$_1$ and A$_2$. The rate at which these pumps increase their delivery will be controlled by valve T which will tend to maintain a predetermined pressure in the braking cylinder during this portion of the cycle. As a result of this action, the car being controlled by the pusher arm (e.g. 21—FIG. 40) would accelerate and continue to accelerate until it reached a maximum velocity and slack bunching will be effected.

If only the car pusher or a particularly light train is being moved, pressure in the braking cylinder (e.g. 26 in FIG. 40) may not reach the predetermined value, e.g. 500 p.s.i. in which case micro-switch 1 would never operate. To accommodate this, a timing relay may be provided in the system so that at all times a few seconds after limit switch 283 trips, solenoids 11 and 21 will be energized introducing pumps A$_1$ and A$_2$ back into the system.

It is assumed at this point that the train is solid in the section of the train involved in the system and all slack movement has been taken up. Limit switch 284 is contacted by knocker 292 (FIG. 35) de-energizing solenoid 10 and energizing solenoid 5. This permits pump C to start removing control oil or hydraulic fluid from the system, thus establishing the final stages of deceleration.

Pump A$_1$ is adapted to return to its zero pumping state before pump A$_2$. When A$_1$ reaches zero position it activates micro-switch 2 located on the pump stroke indicator thus energizing solenoids 6 and 7, and de-energizing solenoid 11 preparing pump A$_1$ to operate the buffer cylinders (e.g. 319, FIG. 37). Deceleration is continued at the same fixed rate until limit switch 285 is contacted, the function of which is to actuate the buffer cylinders (319) by energizing solenoid 12 and directing the output of pump A$_1$ to the buffer cylinders.

Figure 35:
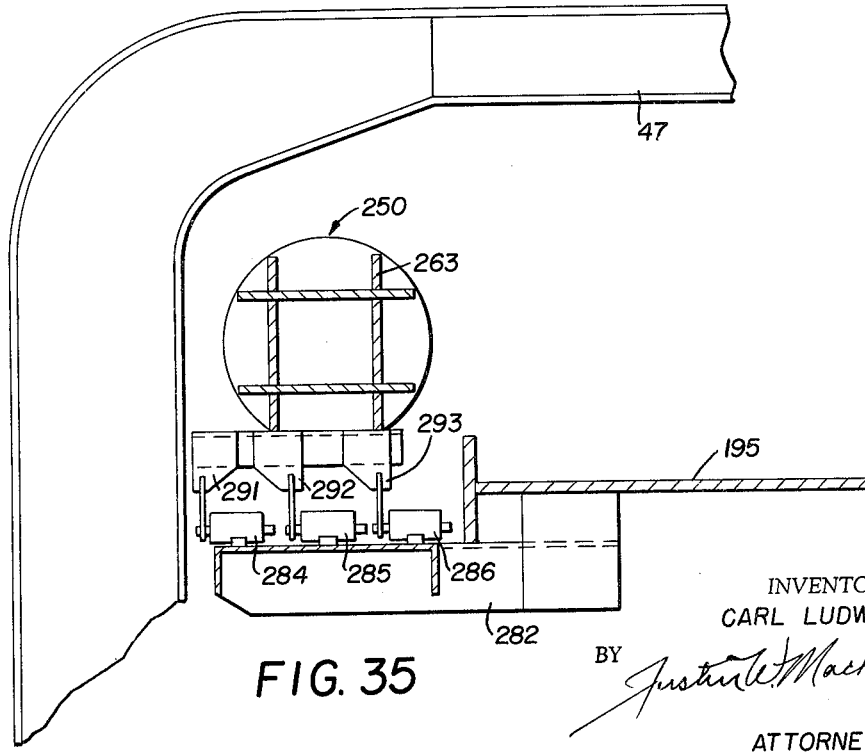
FIG. 35 is a detail partly in section taken at the line 35—35 of FIG. 32.

The car pusher system will thus automatically enter a creep zone. When pump A$_2$ reaches its zero pumping position it will activate its micro-switch 3 which can then de-energize solenoid 21. The pusher will continue to creep at a speed selected by solenoid 2 and pump B until limit switch 286 (FIG. 40) is contacted by knocker 293 (FIG. 35). Limit switch 286 will cause solenoids 2 and 5 to be de-energized stopping the pusher.

Limit switch 323 (FIG. 39) on the movement of buffer arm 304 (FIG. 37) will de-energize solenoid 12 in order to put pump A$_1$ into a zero pumping position. After the buffer is in the engaged position and the train has contacted its stop limit switch, solenoid 8 can be de-energized and solenoid 9 energized in order to retract the pusher arm assembly 188 (FIG. 20).

The pusher arm will retract until it contacts limit switch 279 (FIG. 33) de-energizing solenoids 9 and 6, and energizing solenoids 3, 12 and 22 to start the pusher carriage retract motion and fix the pusher arm in its retracted position.

Upon return to its initial starting position, limit switch 289 is contacted by knocker 292 (FIG. 34) de-energizing solenoids 3, 12 and 22 and energizing solenoids 4 and 6 thus putting the pusher carriage into a creep state. It then contacts limit switch 290 with knocker 293 (FIG. 34) whereupon solenoid 4 is de-energized and solenoid 8 energized to stop the return motion of the pusher carriage assembly and activate engagement of the pusher arm for contact with the next succeeding car. As the pusher arm 188 (FIG. 20) goes into position, it contacts limit switch 277 (FIG. 31) de-energizing solenoid 7 and energizing solenoid 12 effecting disengagement of the buffer.

The buffer (e.g. buffer arm 302, FIG. 37) retracts until it contacts limit switch 324 de-energizing solenoids 6 and 12. At this point the only energized solenoid is 8 and dumping occurs in accordance with the procedure stated supra. Upon return of the dumper to its initial position again actuating limit switch 328 (FIG. 40) and initiating repeat of the cycle. Limit switches 328 and 324 are provided with interlocking means so that when the dumper 17 returns to normal, the pusher is in its car feeding position. The return motion of the pusher will continue, of course, until it is in position at which time the repeat cycle could start.

There has thus been provided an apparatus for the efficient and economical unloading of the bulk contents of a series of open top, or gondola-type railroad cars in a coupled train. This system includes a track for the cars which passes through a rotary car dumper, the portion of the track within the car dumper being severed to permit inversion of the track and the car positioned thereon. In order that the car will not be derailed in the dumping operation, clamps are provided which are actuated by cams and during rotation by gravitational force acting on counterweights to effect release and restraint, respectively, on the car being emptied.

When the dumping operation is complete, through a series of programmed electrical signals, a pair of hydraulically driven car pushing carriages having retractable car engaging fingers advance the train a unit of length determined by the capacity of the rotary dumper, forcing the emptied car or cars out of the dumper and positioning a full car therein. The time for a complete cycle is of the order of one minute per car, and quantities of the magnitude of 10,000 tons per hour may be transferred from rail vehicles to a ship or place of storage.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:

1. In a railroad car unloading apparatus:
   (a) a rotary car dumper designed to turn a car over for dumping its contents;
   (b) a car supporting track extending through the dumper, and having a severed track portion rotatable with the dumper;
   (c) a fluid-actuated ram positioned alongside the track at one end of said dumper, and reciprocable along the track;
   (d) means movably carried by the ram for moving the car into the dumper, including a pair of oppositely disposed fingers for selective engagement with a portion of each of adjacent cars on said track;
   (e) means coacting with the car moving means for expanding and contracting the spacing between said fingers, whereby said fingers selectively engage and disengage said portions;
   (f) means for selectively applying fluid under pressure to extend and retract said ram; and
   (g) means for selectively positioning the car moving means into and out of engagement, respectively, in programmed relation with the extension and retraction of said ram.

2. In a railroad car unloading apparatus:
   (a) a rotary car dumper designed to turn a car over for dumping its contents;
   (b) a car supporting track extending through the dumper, and having a severed track portion rotatable with the dumper;
   (c) a fluid-actuated ram positioned alongside the track at one end of said dumper, and reciprocable along the track;
   (d) an elongated carriage carried by said ram and movable therewith;
   (e) guide means for guiding said carriage alongside the track;
   (f) car pusher arm means carried by said carriage, including:
      (1) an elongated arm mounted for rotation on a vertical axle in said carriage at a point intermediate its ends;
      (2) a fixed laterally extending finger mounted on the external end of said arm;
      (3) a movable laterally extending finger also mounted on said arm end;
      (4) toggle means attached to the internal extremity of said arm for effecting lateral movement thereof on said axle;
      (5) means coacting between the movable finger and carriage to expand and contract, respectively, the spacing between the outer extremities of said fingers;
   (g) means for selectively laterally positioning said car pusher arm means into and out of engagement with a portion of the car on the track; and
   (h) means for selectively applying fluid under pressure to extend and retract said ram.

3. A railroad car unloading apparatus comprising in combination:
   (a) a car unloading station;
   (b) a track extending through said station;
   (c) a pair of hydraulically actuated rams positioned along each side of the track, adjacent said unloading station, for reciprocation parallel to said track;
   (d) means movably carried by the ram for moving cars into a dumper, including a pair of oppositely disposed fingers for selective engagement with a portion of each of adjacent cars on said track; and
   (e) means coacting with the moving means for expanding and contracting the spacing between said fingers, whereby said fingers selectively engage and disengage said portions.

4. A railroad car unloading apparatus comprising in combination:
   (a) a car unloading station;
   (b) a track extending through said station;
   (c) a pair of hydraulically actuated rams positioned along each side of the track, adjacent said unloading station, for controlled reciprocation therealong;
   (d) an elongated carriage carried by said ram, and movable therewith;
   (e) guide means for guiding said carriage alongside said track;
   (f) means carried by the carriage for moving cars along the track into a dumper, including a pair of oppositely disposed fingers for selective engagement with a portion of each of adjacent cars on said track; and
   (g) means coacting with the moving means for expanding and contracting the spacing between said fingers, whereby said fingers selectively engage and disengage said portions.

5. A railroad car unloading apparatus in accordance with claim 4 in which the stabilizing means includes horizontal wheels mounted on said carriage and flanges adapted to coact with said horizontal wheels to confine said carriage to a path parallel to said track.

6. A railroad car unloading apparatus in accordance with claim 5 in which the guide means includes ways adapted to coact with said vertical wheels and disposed above and below said carriage, and vertically extending flanges on said ways adapted to coact with said horizontal wheels.

7. A railroad car unloading apparatus comprising in combination:
   (a) a car unloading station;
   (b) a track extending through said station;
   (c) a pair of hydraulically actuated rams positioned along each side of the track, adjacent said unloading station, for controlled reciprocation therealong;
   (d) means carried by each of said rams for movement transverse to the ram axis and into and out of selective engagement with a portion of a car on the track, and coacting therewith to move the car into said unloading station, said means including:
      (1) an elongated carriage carried by a said ram;
      (2) guide means for guiding said carriage alongside said track;
      (3) car pusher arm means carried by said carriage, including:
         (I) an elongated arm mounted for rotation on a vertical axle in said carriage on the point intermediate its ends;
         (II) the external end of said arm having a fixed laterally extending finger mounted thereon;
         (III) a movable laterally extending finger mounted thereon;
         (IV) toggle means attached to the internal extremity of said arm for effecting lateral movement thereof on said axle; and
         (V) means coacting between said movable finger and said carriage to expand and contract, respectively, the spacing between the outer extremities of said fingers as the arm moves on its axis.

8. A railroad car unloading apparatus in accordance with claim 7 in which said toggle means is hydraulically actuated.

9. A railroad car unloading apparatus in accordance with claim 4, which includes buffer means disposed along side the track adjacent said unloading station, including retractable car engaging means for arresting and positioning said car in said unloading station.

10. A railroad car unloading apparatus in accordance with claim 9 in which the buffer means includes means coacting therewith for actuating said hydraulic rams.

11. A hydraulically actuated railroad car pushing apparatus useful in a railroad car unloading apparatus including a track for supporting said car, comprising in combination:
(a) at least one hydraulically actuated ram positioned alongside of the track for controlled reciprocation therealong;
(b) an elongated carriage carried by said ram and movable therewith;
(c) guide means for guiding said carriage alongside said track;
(d) car pusher arm means carried by said carriage, including:
  (1) an elongated arm mounted for rotation on a vertical axle in said carriage at a point intermediate its ends;
  (2) the external end of said arm having a fixed laterally extending finger mounted thereon;
  (3) a movable laterally extending finger mounted thereon;
  (4) toggle means attached to the internal extremity of said arm for effecting lateral movement thereof on said axle;
  (5) means coacting between said movable finger and said carriage to expand and contract, respectively, the spacing between the outer extremities of said fingers as the arm moves on its axis; and
(e) means for selectively and laterally moving and removing said car pusher arm means.

12. In a car moving device:
(a) a carriage movable along with a car;
(b) an elongated arm mounted for rotation on a vertical axle in the carriage;
(c) a finger mounted on the external end of the arm and laterally extending therefrom; and
(d) another finger also mounted on the end of the arm and laterally extending therefrom, one of the fingers movable to and from the other finger, the fingers designed to engage a portion of the car and to selectively engage a portion of another car secured therewith and adjacent thereto.

References Cited by the Examiner

UNITED STATES PATENTS

| | | | |
|---|---|---|---|
| 869,689 | 10/07 | Brown | 104—162 X |
| 1,162,760 | 12/15 | Fickinger. | |
| 1,403,124 | 1/22 | Lepley | 214—55 X |
| 1,519,925 | 12/24 | Nolan | 214—55 |
| 1,544,988 | 7/25 | Hutton | 214—55 |
| 2,017,392 | 10/35 | Blake | 214—55 X |
| 2,408,284 | 9/46 | Anthony | 214—82 |
| 2,659,499 | 11/53 | Robson | 214—55 |
| 2,659,500 | 11/53 | Kincaid | 214—55 |
| 2,784,852 | 3/57 | Strauss et al. | |
| 2,900,922 | 8/59 | Edmonds | 104—162 |

FOREIGN PATENTS

| | | |
|---|---|---|
| 375,727 | 5/23 | Germany. |
| 449,394 | 10/27 | Germany. |
| 917,810 | 9/54 | Germany. |

HUGO O. SCHULZ, *Primary Examiner.*

GERALD M. FORLENZA, *Examiner.*